US012581028B2

(12) United States Patent
Park et al.

(10) Patent No.: US 12,581,028 B2
(45) Date of Patent: Mar. 17, 2026

(54) DISPLAY APPARATUS

(71) Applicant: SAMSUNG ELECTRONICS CO., LTD., Suwon-si (KR)

(72) Inventors: Yonghwan Park, Suwon-si (KR); Minkeun Kim, Suwon-si (KR); Junki Noh, Suwon-si (KR); Dongmun Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/625,734

(22) Filed: Apr. 3, 2024

(65) Prior Publication Data

US 2024/0259521 A1     Aug. 1, 2024

Related U.S. Application Data

(63) Continuation of application No. PCT/KR2022/017230, filed on Nov. 4, 2022.

(30) Foreign Application Priority Data

Dec. 28, 2021     (KR) ........................ 10-2021-0190272

(51) Int. Cl.
*H04N 5/64*        (2006.01)
*F16M 11/04*       (2006.01)
*H04N 5/645*       (2006.01)
(52) U.S. Cl.
CPC ............. *H04N 5/645* (2013.01); *F16M 11/04* (2013.01); *F16M 2200/02* (2013.01)

(58) Field of Classification Search
CPC .......... H04N 5/645; H04N 5/64; F16M 11/04; F16M 2200/02; F16M 2200/028; F16M 11/041; F16M 11/22; F16M 11/20
See application file for complete search history.

(56) References Cited

U.S. PATENT DOCUMENTS 7,497,410 B2     3/2009 Lee
8,083,193 B2     12/2011 Matsui et al.
(Continued)

FOREIGN PATENT DOCUMENTS

CN         202418130 U     9/2012
CN         204983998 U     1/2016
(Continued)

OTHER PUBLICATIONS

International Search Report (PCT/ISA/210) issued on Feb. 15, 2023 by the International Searching Authority in International Patent Application No. PCT/KR2022/017230.
(Continued)

*Primary Examiner* — Timothy R Newlin
(74) *Attorney, Agent, or Firm* — Sughrue Mion, PLLC

(57) ABSTRACT

A display apparatus includes: a display panel; a rear support member at a rear of the display panel and including a stud protruding rearward; a stand configured to be coupled to the rear support member and including a key hole into which the stud is inserted in a first direction, wherein the stand is configured to be moved in a second direction relative to the stud; and a holder configured to be coupled to the stand and move the stand in the second direction so that the stud inserted into the key hole is locked in the key hole.

15 Claims, 17 Drawing Sheets

(56) References Cited

U.S. PATENT DOCUMENTS

| | | | | |
|---|---|---|---|---|
| 9,546,756 | B1* | 1/2017 | Hung | F16M 13/02 |
| 10,649,257 | B2 | 5/2020 | Kawashima | |
| 11,068,022 | B2 | 7/2021 | So et al. | |
| 2005/0035253 | A1* | 2/2005 | Rixom | F16M 11/10 348/E5.143 |
| 2005/0078230 | A1* | 4/2005 | Alsberg | H04N 5/64 348/839 |
| 2005/0127260 | A1* | 6/2005 | Dittmer | F16M 11/041 248/221.11 |
| 2006/0011797 | A1* | 1/2006 | Akagawa | F16M 11/22 248/442.2 |
| 2007/0045505 | A1* | 3/2007 | Chen | F16M 11/041 361/679.21 |
| 2007/0046837 | A1* | 3/2007 | Elberbaum | F16M 13/02 348/739 |
| 2007/0046840 | A1* | 3/2007 | Yokawa | F16M 11/22 348/794 |
| 2007/0195495 | A1 | 8/2007 | Kim et al. | |
| 2011/0043980 | A1* | 2/2011 | Ogura | F16M 11/16 361/679.01 |
| 2011/0205032 | A1* | 8/2011 | Sekino | G06F 1/1607 361/679.21 |
| 2013/0094127 | A1 | 4/2013 | Lu | |
| 2014/0158647 | A1* | 6/2014 | Geier | F16M 11/2014 211/26 |
| 2014/0166826 | A1* | 6/2014 | Liao | F16M 11/041 403/327 |
| 2014/0239133 | A1* | 8/2014 | Burns | F16M 11/04 248/121 |
| 2014/0270910 | A1* | 9/2014 | Sculler | H04N 5/64 403/109.1 |
| 2015/0041622 | A1* | 2/2015 | Mulhern | A47B 23/04 248/688 |
| 2015/0131214 | A1* | 5/2015 | Liu | G06F 1/1601 361/679.01 |
| 2016/0031382 | A1* | 2/2016 | Chinn | A61B 90/50 29/428 |
| 2016/0368431 | A1* | 12/2016 | Boer | F16M 13/02 |
| 2018/0370017 | A1* | 12/2018 | Weitsman | F16M 13/02 |
| 2019/0226635 | A1* | 7/2019 | Sung | H05K 5/0204 |
| 2020/0081483 | A1* | 3/2020 | Laurent | G06F 1/166 |
| 2020/0174515 | A1* | 6/2020 | So | F16M 11/08 |
| 2020/0363007 | A1* | 11/2020 | Daniels | H02S 30/10 |
| 2020/0412998 | A1* | 12/2020 | Bremmon | H04N 5/655 |
| 2021/0332942 | A1* | 10/2021 | Chung | F16M 13/02 |
| 2021/0404599 | A1* | 12/2021 | Cook | E05B 65/52 |
| 2022/0092921 | A1* | 3/2022 | Barbour | F16M 11/046 |
| 2022/0403975 | A1* | 12/2022 | Bae | F16M 11/041 |

FOREIGN PATENT DOCUMENTS

| | | | |
|---|---|---|---|
| JP | 2007-178502 | A | 7/2007 |
| JP | 5489160 | B2 | 5/2014 |
| JP | 2014-202940 | A | 10/2014 |
| JP | 2019-56428 | A | 4/2019 |
| JP | 6867205 | B2 | 4/2021 |
| JP | 7033900 | B2 | 3/2022 |
| KR | 10-2001-0105714 | A | 11/2001 |
| KR | 10-2007-0084650 | A | 8/2007 |
| KR | 10-2008-0010675 | A | 1/2008 |
| KR | 10-0846898 | B1 | 7/2008 |
| KR | 10-0873131 | B1 | 12/2008 |
| KR | 10-2009-0081817 | A | 7/2009 |
| KR | 10-1059089 | B1 | 8/2011 |
| KR | 20-2013-0003252 | U | 6/2013 |
| KR | 10-1822499 | B1 | 1/2018 |
| KR | 10-1903605 | B1 | 10/2018 |
| KR | 10-2270693 | B1 | 6/2021 |

OTHER PUBLICATIONS

Written Opinion (PCT/ISA/237) issued on Feb. 15, 2023 by the International Searching Authority in International Patent Application No. PCT/KR2022/017230.

Communication dated Dec. 23, 2024, issued by the European Patent Office in European Application No. 22916381.1.

Communication issued Nov. 19, 2025 by the Korean Ministry of Intellectual Property in Korean Patent Application No. 10-2021-0190272.

* cited by examiner

DISPLAY APPARATUS

CROSS-REFERENCE TO RELATED APPLICATIONS

This application is a by-pass continuation application of International Application No. PCT/KR2022/017230, filed on Nov. 4, 2022, which is based on and claims priority to Korean Patent Application No. 10-2021-0190272, filed on Dec. 28, 2021, in the Korean Intellectual Property Office, the disclosures of which are incorporated by reference herein their entireties.

BACKGROUND

1. Field

The disclosure relates to a display apparatus, and more particularly, to a rear support member positioned at the rear of the display apparatus and a stand supporting the display apparatus.

2. Description of Related Art

A display apparatus visually displays data information, such as letters and shapes, and images.

Display apparatuses may be classified as a wall-mounted display apparatus, which is used by being fixed to a wall, and a stand-type display apparatus, which is used by standing on a floor.

The stand-type display apparatus may include a stand for supporting a display so that the display may be erected on the floor. Generally, the stand may be coupled to a rear support member positioned at the rear of a display panel to support the display panel.

In a process of coupling the stand to the rear support member, screws may be used. In a case in which parts of the display apparatus are coupled using screws, because a separate fastening tool is required for screw fastening, the convenience of assembly may be reduced. In addition, because time is required for screw fastening, assembly time may increase. In addition, because the display apparatus needs to have a thickness at least equal to a length of screw threads to enable assembly of the parts, slimming a product may be difficult.

SUMMARY

Provided is a display apparatus enabling coupling a stand to a rear support member without screws. Further, provided is a display apparatus enabling firmly coupling a stand even without screws when the stand is coupled to a rear support member.

According to an aspect of the disclosure, a display apparatus includes: a display panel; a rear support member at a rear of the display panel and including a stud protruding rearward; a stand configured to be coupled to the rear support member and including a key hole into which the stud is inserted in a first direction, wherein the stand is configured to be moved in a second direction relative to the stud; and a holder configured to be coupled to the stand and move the stand in the second direction so that the stud inserted into the key hole is locked in the key hole.

The rear support member may include a reaction rib protruding toward the holder, wherein the holder includes an action rib at a position corresponding to the reaction rib, wherein the action rib is configured to press one side of the reaction rib in the second direction by rotation of the holder, and wherein the stand is configured to move in the second direction while the action rib presses the reaction rib by the rotation of the holder.

The holder may be configured to rotate between a first position in which the action rib presses the reaction rib and a second position in which the action rib does not press the reaction rib.

The action rib may protrude toward the reaction rib and does not press an opposite side of the second direction of the key hole when the holder is in the first position.

The holder may further include a pressing protrusion protruding toward the rear support member and pressing the rear support member toward the front when the holder is in the first position.

The rear support member may include: a rear cover at the rear of the display panel; and a rear chassis between the rear cover and the display panel and supporting the display panel from the rear, and wherein the stud is coupled to the rear chassis so that the rear chassis supports the stand.

The stud may include: a first stud; and a second stud below the first stud, wherein the reaction rib is between the first stud and the second stud, and wherein a distance between the reaction rib and the first stud is equal or substantially similar to a distance between the reaction rib and the second stud.

The rear chassis may include a rear chassis body, wherein the stud may include: a head positioned at an end in the first direction; and a neck extending from the head toward the rear chassis body and having a diameter smaller than a diameter of the head, and wherein the key hole may include: a first hole having a diameter larger than the diameter of the head; and a second hole extending from the first hole and having a diameter smaller than the diameter of the head and larger than the diameter of the neck.

The stand may include a guide protrusion protruding upward from an upper surface of the stand, and wherein the rear cover may include a guide groove at a position corresponding to the guide protrusion and into which the guide protrusion is inserted.

The stand may include a guide hook extending forward from a front surface of the stand and then extending to be bent toward an upper side of the stand, wherein the rear cover may include a guide hook groove at a position corresponding to the guide hook, and wherein the guide hook may be inserted into the guide hook groove.

The holder may further include an insertion protrusion protruding toward the rear cover when in the first position, and wherein the stand may further include an insertion hole into which the insertion protrusion is inserted to fix the holder when the holder is in the first position.

The reaction rib may include: a first portion extending in a lateral direction; and a second portion spaced apart from the first portion in the lateral direction and extending in the lateral direction.

The stud may include: a first stud on a left side; and a second stud symmetrical to the first stud.

The second direction may be an upward direction, wherein the stand may further include a stand coupling part coupled to the rear cover, and wherein the rear cover may include a stand recess that is recessed forward and having a shape corresponding to the stand coupling part.

The holder may be configured to be moved from the second position to the first position by being rotated upward and moved from the first position to the second position by being rotated downward.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
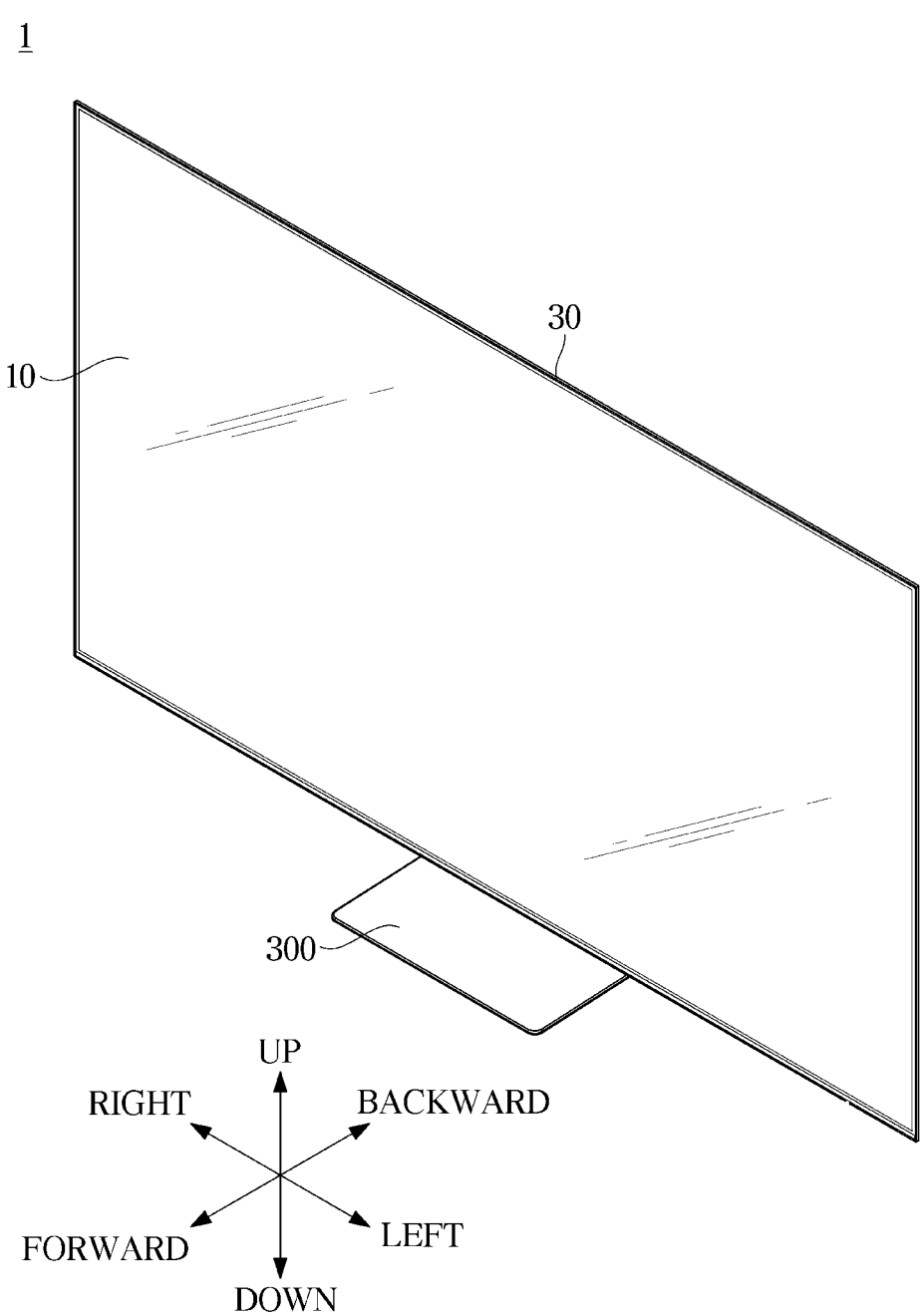
FIG. 1 is a front perspective view of a display apparatus according to an embodiment of the disclosure.

The embodiments described in the disclosure and the configurations shown in the drawings are only examples, and various modifications may be made to the example embodiments of the present disclosure.

Same reference numbers or signs in the various drawings of the application represent parts or components that perform substantially the same functions.

The terms used herein are for the purpose of describing the embodiments and are not intended to restrict and/or to limit the disclosure. For example, the singular expressions herein may include plural expressions, unless the context clearly dictates otherwise. Also, the terms "comprises" and "has" are intended to indicate that there are features, numbers, steps, operations, components, parts, or combinations thereof described in the disclosure, and do not exclude the presence or addition of one or more other features, numbers, steps, operations, components, parts, or combinations thereof. The terms "include" and "comprise", and the derivatives thereof refer to inclusion without limitation.

Although the terms "first," "second," etc. may be used herein to describe various components, these components should not be limited by these terms, and the terms are only used to distinguish one component from another. For example, without departing from the scope of the disclosure, a first component may be referred to as a second component, and similarly, the second component may also be referred to as a first component. The term "and/or" includes any combination of a plurality of related items or any one of a plurality of related items.

In this disclosure, the terms "up-down direction," "lower side," and "front-rear direction" used in the following description are defined with reference to the drawings, and the shape and position of each component are not limited by these terms.

The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C, and any variations thereof. As an additional example, the expression "at least one of a, b, or c" may indicate only a, only b, only c, both a and b, both a and c, both b and c, all of a, b, and c, or variations thereof. Similarly, the term "set" means one or more. Accordingly, the set of items may be a single item or a collection of two or more items.

Specifically, as illustrated in FIG. 1, a direction to which a display panel 10 directs will be defined as the front, and the rear, left and right, and upper and lower sides will be defined based on this direction.

Hereinafter, embodiments of the disclosure will be described in detail with reference to the accompanying drawings.

Figure 2:
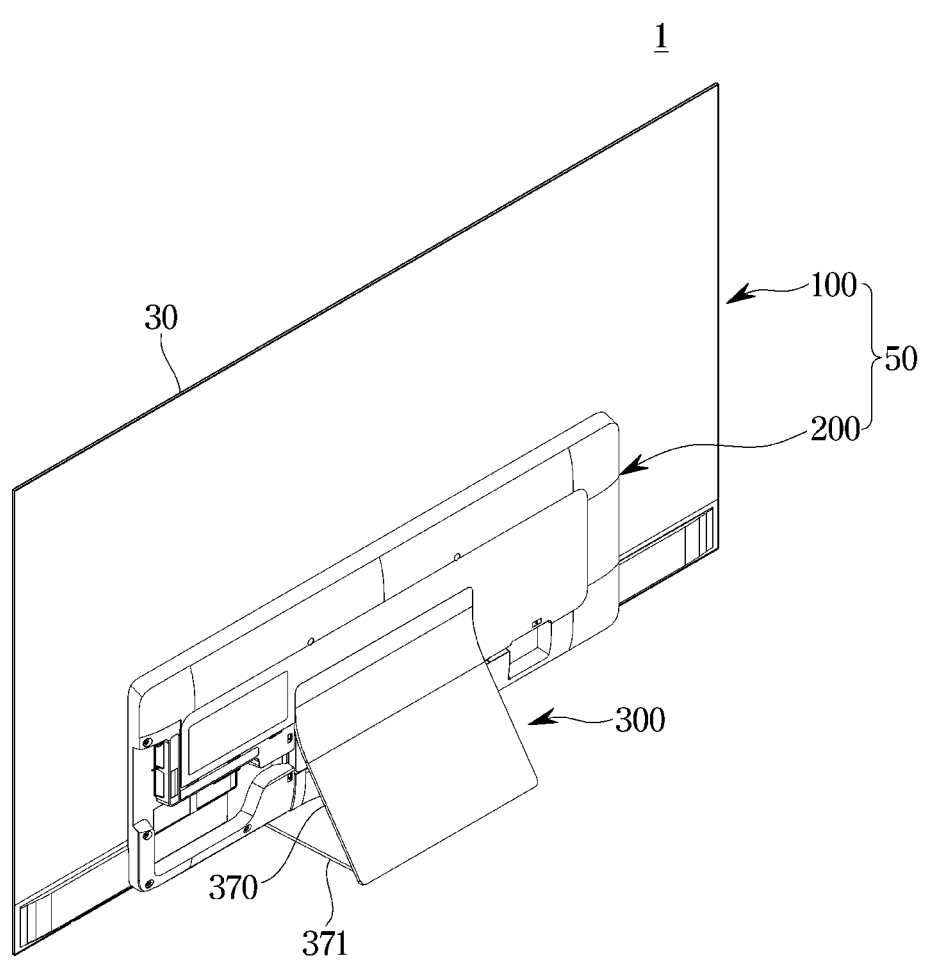
FIG. 2 is a rear perspective view of the display apparatus of FIG. 1.
Figure 2:
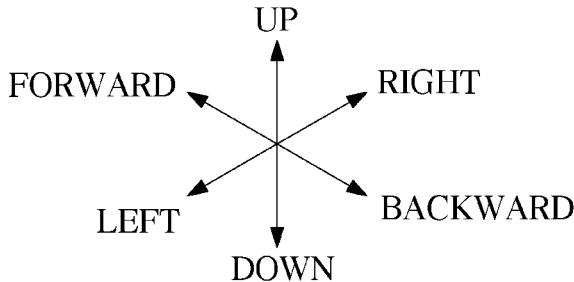

FIG. 1 is a front perspective view of a display apparatus according to an embodiment of the disclosure. FIG. 2 is a rear perspective view of the display apparatus of FIG. 1.

A display apparatus 1 is an apparatus capable of processing an image signal received from the outside and visually displaying the processed image. Hereinafter, a case in which the display apparatus 1 is a television (TV) is exemplified, but embodiments of the disclosure are not limited thereto. For example, the display apparatus 1 may be implemented in various forms such as a monitor, a portable multimedia device, and a portable communication device, and the form of the display apparatus 1 is not limited as long as it is an apparatus that visually displays an image.

The display apparatus 1 may receive content data including video data and audio data from various content sources, and output video and audio corresponding to the video data and audio data. For example, the display apparatus 1 may receive content data through a broadcast reception antenna or a wired cable, receive content data from a content reproducing device, or receive content data from a content providing server of a content provider.

As illustrated in FIGS. 1 and 2, an exterior of the display apparatus 1 may be formed by a display panel 10, a front chassis 30, and a rear support member 50 including a rear cover 200 and a rear chassis 100.

The display apparatus 1 may include the display panel 10 provided on a front side of the display apparatus 1 to display an image. The display apparatus 1 may include a power supply device provided to supply power to the display panel 10, and a main board provided to control the overall operation of the display panel 10.

The display panel 10 may include self-light emitting display elements or light-receiving display elements.

The self-light emitting display elements may visually output images by emitting light on their own without a separate light source. For example, light emitting diodes (LEDs), organic light emitting diodes (OLEDs), quantum dot-organic light emitting diodes (QD-OLED), micro LEDs made of inorganic light-emitting materials, etc. may be elements that may emit light on their own based on supplied electric current.

The light-receiving display elements may include display elements that require a separate light source. For example, a liquid crystal display (LCD), which is a light-receiving display element, changes the arrangement of liquid crystals through electric current, but requires a separate light source to visually output images through the changed arrangement of liquid crystals.

The display apparatus 1 of the disclosure may be applied to both the display panel 10 having self-light emitting display elements and the display panel 10 having light-receiving display elements. However, in the disclosure, the display panel 10 including the self-light emitting display elements, particularly OLED elements will be described.

The display panel 10 may have a rectangular shape.

The front chassis 30 extending along edges of the display panel 10 may be provided to protect the display panel 10 in an up-down direction and a left-right direction.

The rear support member 50 may be provided at the rear of the display panel 10 to protect the rear of the display panel 10 and support the rear of the display panel 10.

The rear support member 50 may include the rear cover 200 positioned at the rear of the display panel 10, and the rear chassis 100 positioned between the rear cover 200 and the display panel 10 to support the display panel 10 from the rear.

The rear cover 200 may cover the entire rear of the rear chassis 100. However, the rear cover 200 may also cover a portion of the rear of the rear chassis 100. In a case in which the rear cover 200 covers a portion of the rear of the rear chassis 100, the rear chassis 100 and the rear cover 200 may form a rear exterior of the display apparatus 1. In this case, a user may perceive as the display apparatus 1 having a thickness from the display panel 10 to the rear chassis 100 rather than from the display panel 10 to the rear cover 200, so that an ultra-slim exterior may be implemented.

The display panel 10 may require a stand 300 to be installed stably. A description will be given assuming that the stand 300 includes a surface supporting a load of the display panel 10 on a lower side of the display panel 10 to prevent the display panel 10 from falling over. However, the stand 300 is not limited thereto, and may support the display panel 10 by fixing the display panel 10 to a wall at the rear of the display panel 10.

The stand 300 may be coupled to the rear support member 50 to support the display panel 10.

The stand 300 coupled to the rear support member 50 may include a stand leg 370 extending downward, and a stand foot 371 including the surface supporting the load of the display panel 10 by being in contact with the floor.

A description is given assuming that the single stand 300 is provided at a position corresponding to a center of the display panel 10. However, embodiments of the disclosure are not limited thereto, and the display apparatus 1 may include a plurality of the stands 300 provided symmetrically on the left and right with respect to the center of the display panel 10.

Hereinafter, components further included in the display apparatus 1 will be described.

Figure 3:
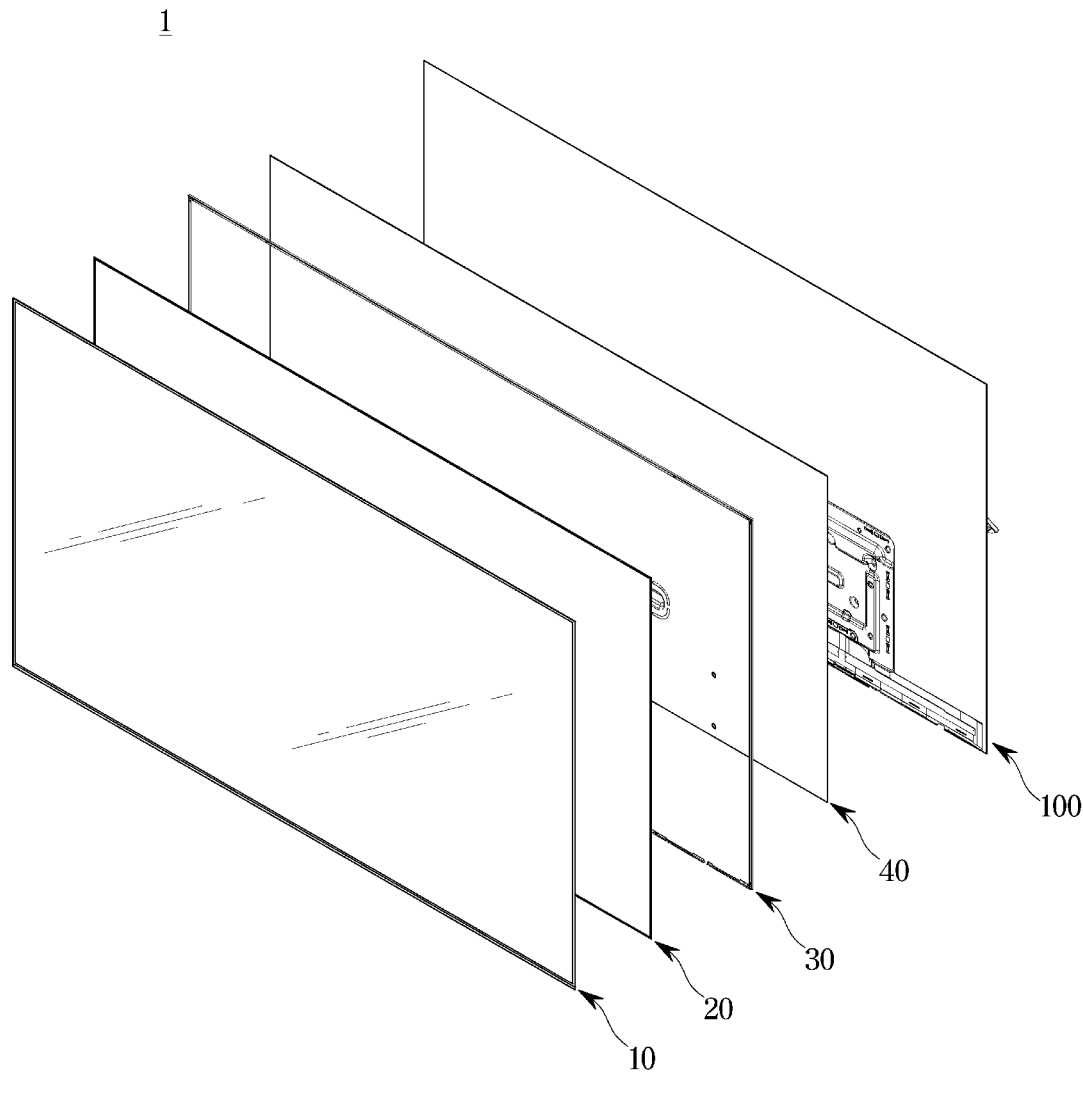
FIG. 3 is an exploded perspective view of the display apparatus of FIG. 1.
Figure 4:
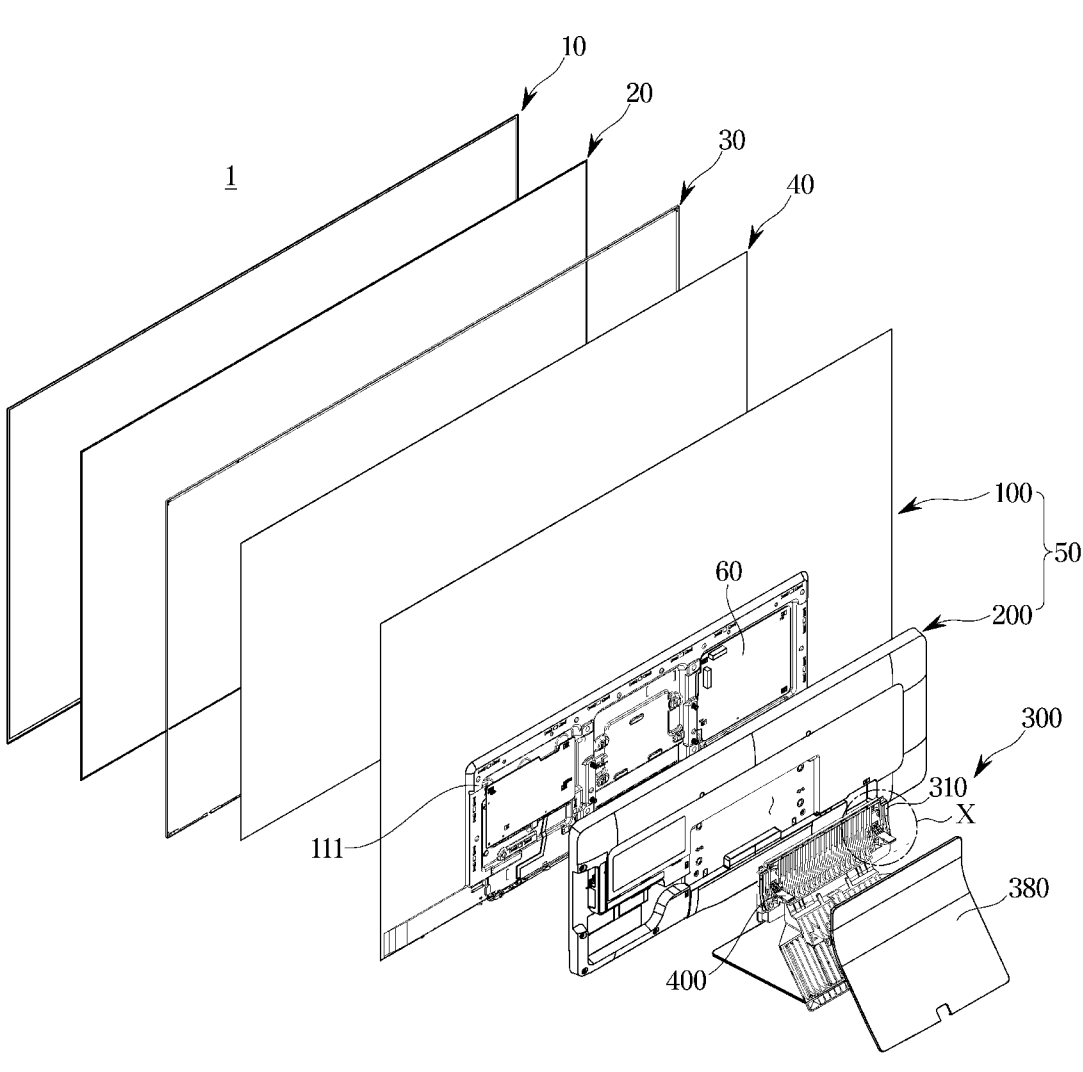
FIG. 4 is a rear exploded perspective view of the display apparatus of FIG. 1.

FIG. 3 is an exploded perspective view of the display apparatus of FIG. 1. FIG. 4 is a rear exploded perspective view of the display apparatus of FIG. 1.

As illustrated in FIGS. 3 and 4, a panel heat dissipation sheet 20 may be coupled to the rear of the display panel 10. The panel heat dissipation sheet 20 may receive heat generated by the display panel 10 while emitting light and radiate the generated heat to the outside.

The rear chassis 100 may be positioned at the rear of the panel heat dissipation sheet 20 to support the display panel 10. Because the display panel 10 may be provided in the shape of a thin plate, the display panel 10 may be bent due to impact. Accordingly, in order to improve the strength of the display panel 10, the rear chassis 100 having a plate shape may be coupled to the rear of the panel heat dissipation sheet 20. The rear chassis 100 may be made of a metal material to have high strength.

In order to increase the strength of the rear chassis 100, the rear chassis 100 may include a bead 111 having a shape of protruding rearward.

In a case in which the display panel 10 includes the self-light emitting display elements, a separate light source may not be included, and in this case, because a backlight including a light guide plate, etc. may not be included, a member for supporting the display panel 10 to prevent the display panel 10 from being bent may be additionally required.

For this purpose, an inner plate 40 may be positioned between the panel heat dissipation sheet 20 and the rear chassis 100. The inner plate 40 may be made of a metal material having a plate shape. Through this, the display panel 10 may be prevented from being bent by being supported.

A substrate 60 may be positioned at the rear of the rear cover 200 to control the display panel 10 and various electrical components. A main board provided to control the display panel 10 may be mounted on the substrate 60.

The rear cover 200 may be coupled to the rear of the rear chassis 100 to cover the substrate 60. The rear cover 200 may be made of plastic injection molding to reduce the manufacturing cost of the display apparatus 1. However, in order to enhance the strength of the rear cover 200, the rear cover 200 may also be made of a metal material.

The rear chassis 100 and the rear cover 200 may serve to support the display panel 10 at the rear of the display panel 10. When a member supporting the rear of the display panel 10 is the rear support member 50, the rear chassis 100 and the rear cover 200 may be included in the rear support member 50.

The stand 300 may be coupled to the rear of the rear support member 50 to support the display panel 10. The stand 300 may include a stand body 310 and a stand cover 380 covering the rear of the stand body 310.

As described above, a method by which the stand 300 is coupled to the rear support member 50 may be a method according to the disclosure, except for fastening by screws.

Hereinafter, the method of coupling the stand 300 and the rear support member 50 according to the disclosure will be described. Because the rear chassis 100 and the rear cover 200 are included in the rear support member 50, methods of coupling the rear chassis 100, the rear cover 200 and the stand 300 therebetween will be described below. First, the method of coupling the rear chassis 100 and the rear cover 200 will be described.

Figure 5:
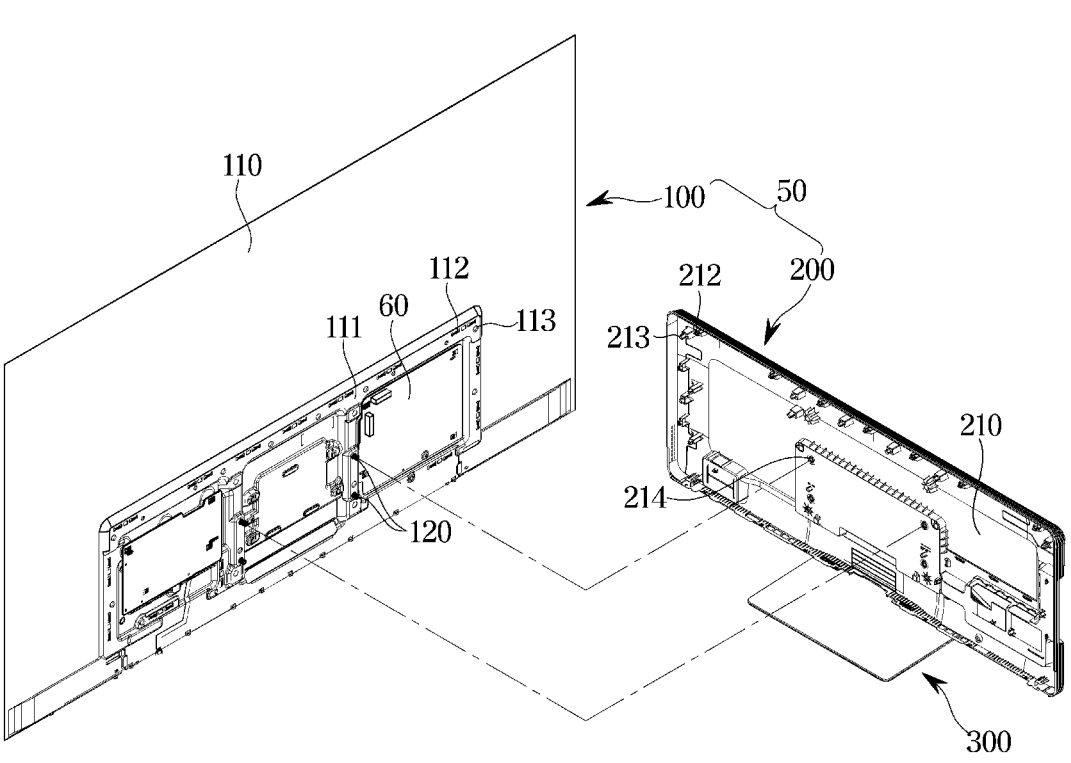
FIG. 5 is an exploded view illustrating that a rear support member is separated into a rear chassis and a rear cover in the display apparatus of FIG. 2.

FIG. 5 is an exploded view illustrating that a rear support member is separated into a rear chassis and a rear cover in the display apparatus of FIG. 2.

As illustrated in FIG. 5, the rear cover 200 may be coupled to the rear of the rear chassis 100.

The rear chassis 100 may include a rear chassis body 110.

The bead 111 protruding rearward may be formed in a lower center of the rear chassis body 110. A central portion of the bead 111 may be provided in a shape of being recessed forward again such that the substrate 60 may be mounted thereon. The bead 111 may be provided in a square shape at a lower center of the rear chassis 100. Because the center portion of the square shape where the bead 111 is provided may be provided in a shape of allowing the substrate 60 to be mounted thereon, the bead 111 may have a shape of protruding rearward along the edges of the square.

In a case in which the three substrates 60 are mounted, the three squares are provided, and the beads 111 may be formed along the edges of the squares. In a case in which the squares each share one side and are arranged in a row in the left-right direction, the beads 111 may be formed along these.

In a case in which the rear chassis 100 is made of a metal material, the bead 111 may be formed through a press process.

The rear cover 200 may be provided to cover the bead 111 and the substrate 60.

The rear cover 200 may include a rear cover body 210.

A wire 112 may be positioned on the bead 111. A wire coupling part 212 having a hook shape may be formed at a position corresponding to the wire 112 to couple the rear cover 200 and the wire 112. The wire coupling part 212 may be provided in the front of the rear cover body 210. The rear cover 200 may be coupled to the rear chassis 100 through coupling of the wire 112 and the wire coupling part 212. Through this coupling, the rear cover 200 may be coupled to the rear chassis 100 without using screws.

An accommodating part 113 having a hole shape may be provided on the bead 111. The rear cover 200 may include a protrusion 213 protruding forward to be inserted into the accommodating part 113. As the protrusion 213 of the rear cover 200 is accommodated in the accommodating part 113 of the rear chassis 100, the rear cover 200 may be guided to be coupled to an accurate position of the rear chassis 100.

The rear chassis 100 may include a stud 120 protruding rearward. A stud hole 214 may be formed on the rear cover 200 at a position corresponding to the stud 120 when the rear cover 200 is coupled to the rear chassis 100 so that the stud 120 may penetrate the rear cover 200.

In this case, the stud 120 may be coupled to the bead 111 to pass through the stud hole 214 of the rear cover 200. The stud 120 may be positioned adjacent to the bead 111.

As will be described later, the stand 300 may be coupled to the rear chassis 100 through the stud 120. Because the single stand 300 is positioned in the center, the stud 120 may be positioned on the bead 111 formed in the center.

The method of coupling the rear chassis 100 and the rear cover 200 has been described above. The methods of coupling the rear chassis 100, the rear cover 200 and the stand 300 therebetween will be described below.

Figure 6:
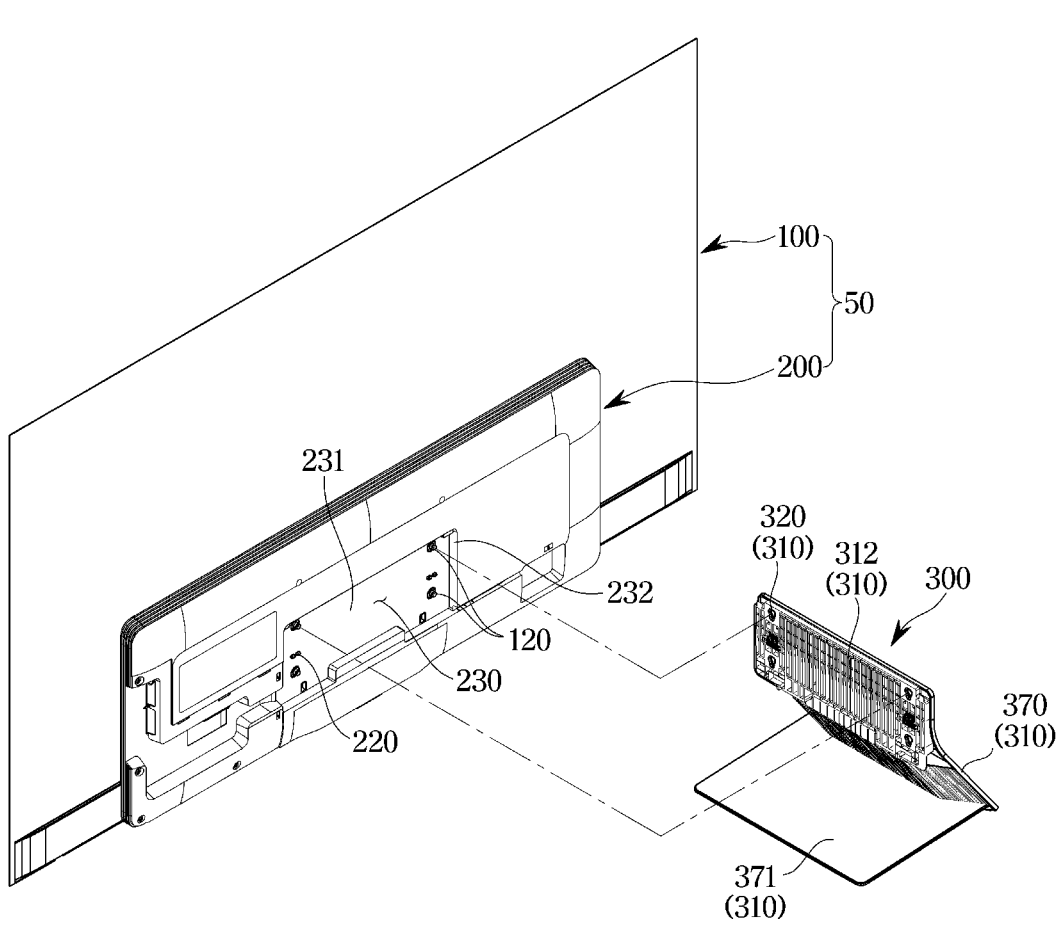
FIG. 6 is an exploded view illustrating that the rear support member and a stand are separated in the display apparatus of FIG. 2.
Figure 7:
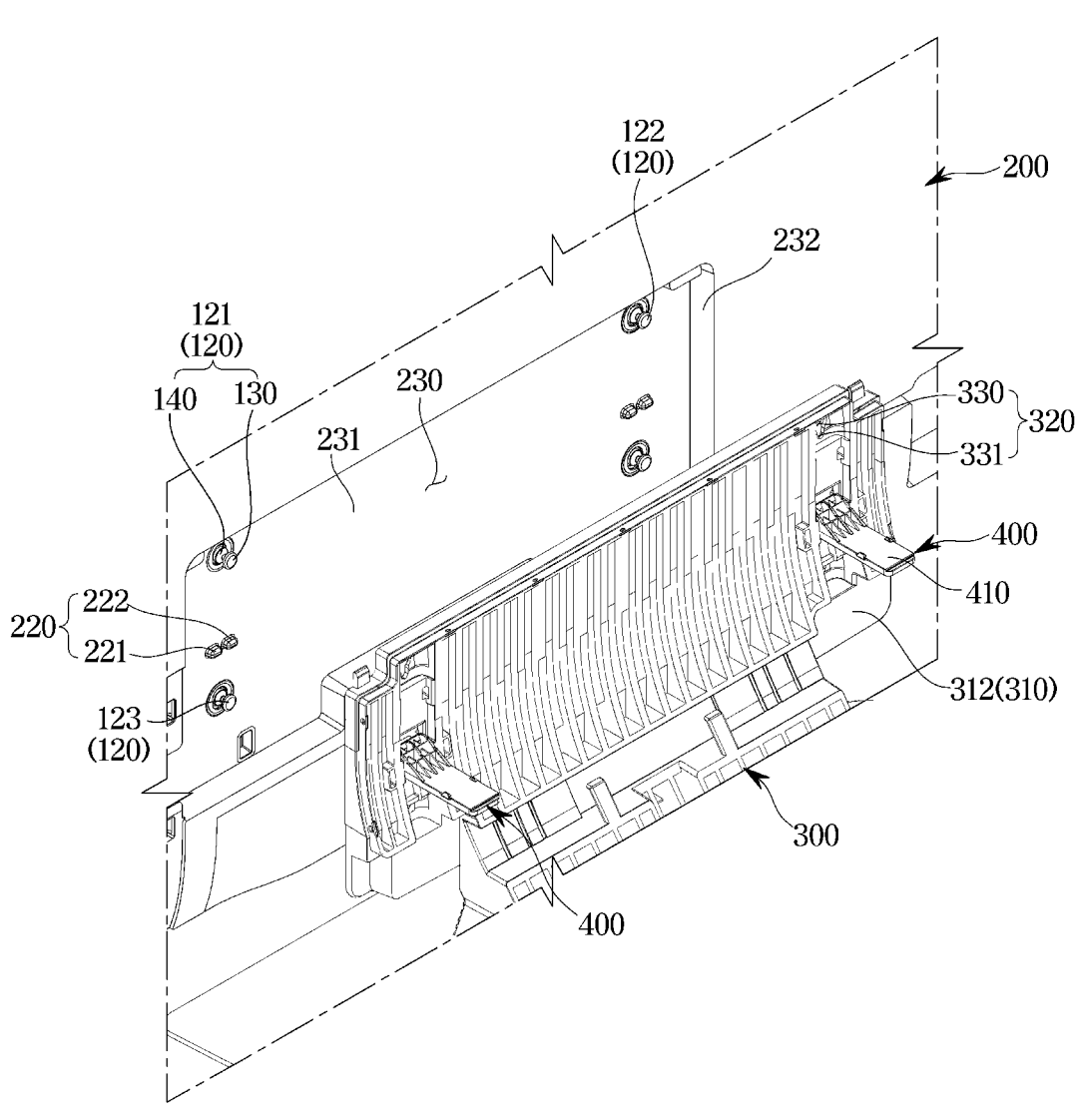
FIG. 7 is an enlarged view illustrating that the rear support member and the stand of the display apparatus of FIG. 6 are coupled to each other.

FIG. 6 is an exploded view illustrating that the rear support member and a stand are separated in the display apparatus of FIG. 2. FIG. 7 is an enlarged view illustrating that the rear support member and the stand of the display apparatus of FIG. 6 are coupled to each other.

As illustrated in FIGS. 6 and 7, the stud 120 may protrude toward the rear of the rear cover 200 by penetrating the stud hole 214 formed on the rear cover 200. The stand 300 may be coupled to a protruding portion of the stud 120.

The stand 300 may include the stand body 310 and the stand cover 380 coupled to the rear of the stand body 310 to form an exterior of a rear surface of the stand 300. The stand cover 380 may be provided in a shape corresponding to the rear of the stand body 310.

The stand body 310 may include a stand coupling part 312 provided to be inserted into and in contact with the rear cover 200. The stand leg 370 extending downward from a lower side of the stand coupling part 312 may be provided. The stand foot 371 may be provided to extend forward from one end of the stand leg 370 to have a surface supporting the load of the display apparatus 1 from a lower side thereof. The stand leg 370 may be formed to be inclined downward toward the rear so that the surface formed on the stand foot 371 to support the load of the display apparatus 1 is expanded.

The stand coupling part 312 included in the stand body 310 may have a square shape with a flat front and a pillar shape extending toward the front.

The rear cover 200 may include a stand recess 230 provided to be recessed forward in a shape corresponding to the stand coupling part 312 so that the stand coupling part 312 may be accommodated therein. As the stand coupling part 312 is coupled to the stand recess 230, movement of the stand coupling part 312 may be guided. Accordingly, the stand 300 may be inserted into the rear cover 200 at an accurate position.

In this case, a portion where the stand coupling part 312 is in contact with the rear cover 200 and forming the front of the stand recess 230 may be referred to as a stand contact portion 231. Also, a portion extending rearward from the stand contact portion 231 to form an inner surface of the stand recess 230 may be referred to as a stand guide portion 232.

The stand body 310 may include a key hole 320 provided to penetrate in a front-rear direction. The stud 120 may be inserted into the key hole 320. As the stud 120 is inserted into the key hole 320, the stand 300 may be coupled to the rear chassis 100.

As described above, the rear chassis 100 may be made of a metal material, and the rear cover 200 may be made of a plastic material. In this case, because the strength of the rear chassis 100 is higher than that of the rear cover 200, in order for the stand 300 to be stably coupled to the rear support member 50, it is appropriate for the stand 300 to be coupled to the rear chassis 100 rather than the rear cover 200. Therefore, the description below will be made assuming that the stand 300 is coupled to the rear chassis 100. However, because the disclosure does not exclude that the rear cover 200 is made of a metal material, in this case, the stand 300 may be coupled to the rear cover 200.

The stud 120 may include a head 130 positioned at a rear end thereof. A neck 140 extending from the head 130 toward the rear chassis body 110 and having a diameter smaller than a diameter smaller of the head 130 may be provided. Therefore, the stud 120 may have a shape similar to a nail.

The key hole 320 through which the stud 120 may pass may include a first hole 330 having a diameter larger than the diameter of the head 130 so that the head 130 may be inserted. In order to prevent the stud 120 from being separated after being inserted into the key hole 320, the key hole 320 may include a second hole 331 extending from the first hole 330 and having a diameter smaller than the diameter of the head 130 and larger than the diameter of the neck 140.

The stud 120 may be inserted into the first hole 330 and then moved toward the second hole 331. In a case in which the stud 120 is located in the second hole 331, when the stand 300 is moved rearward, the head 130 of the stud 120 does not pass through the second hole 331 and is caught on the second hole 331, so that the stand 300 is prevented from being separated from the rear cover 200 and the rear chassis 100.

In this case, the case in which the stud 120 is located in the second hole 331 may be referred to as a first state of the stud 120, and a case in which the stud 120 is located in the first hole 330 may be referred to as a second state of the stud 120.

A direction in which the stud 120 is inserted into the key hole 320 may be referred to as a first direction. In order for the stud 120 to be moved, the user needs to move the stand 300. In this case, a direction in which the stand 300 is moved such that the stud 120 is in the first state may be referred to as a second direction.

According to the above description, the stand 300 is coupled to the rear chassis 100 and the rear cover 200 by coupling the stud 120 to the key hole 320. The stud 120 and the key hole 320 may be provided to be left and right symmetrical with respect to the display panel 10. Through this, the display panel 10 may be prevented from being tilted left and right. In this case, the stud 120 on the left may be referred to as a 'first stud' 121, and the stud 120 on the right may be referred to as a 'second stud' 122.

A holder 400 provided such that the stud 120 inserted into the key hole 320 is locked may be coupled to the stand 300. The holder 400 may lock the stud 120 by moving the stand 300 in the second direction. The holder 400 may move the stand 300 in the second direction by interacting with a reaction rib 220 provided on the stand recess 230. A more detailed description of the holder 400 will be provided below with reference to FIG. 13.

The method by which the stand 300 is coupled to the rear cover 200 by the stud 120 being inserted into the key hole 320 will be described in more detail below.

Figure 8:
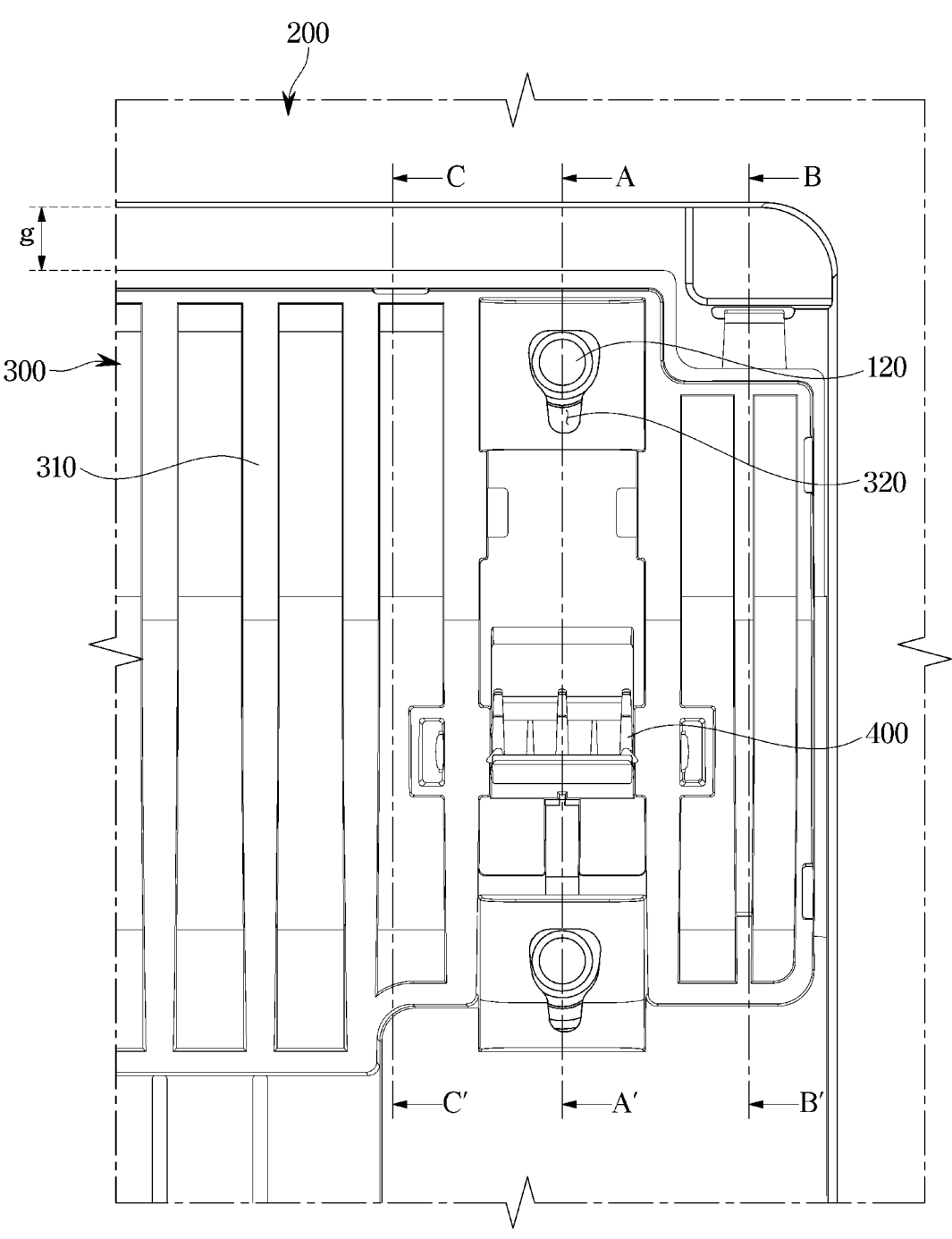
FIG. 8 is a rear view illustrating that a stud of the rear support member of FIG. 7 is inserted into a key hole of the stand.

FIG. 8 is a rear view illustrating that a stud of the rear support member of FIG. 7 is inserted into a key hole of the stand.

As illustrated in FIG. 8, the stud 120 may be in the second state of being inserted into the key hole 320. The head 130 of the stud 120 may be located to pass through the first hole 330 of the key hole 320.

The stud 120 and the key hole 320 may be additionally provided on a lower side of the stud 120 so that the coupling between the stand 300, the rear chassis 100, and the rear cover 200 is stably kept vertically.

The stand 300 may be moved in the second direction. As illustrated in FIG. 8, the second direction may be an upward direction. However, this is only an example, and the second direction is not limited thereto.

When the stand 300 is moved in the second direction, the stud 120 may be relatively moved in a direction opposite to the second direction.

Because the second hole 331 may provide a space in which the stud 120 is moved and accommodated, the second hole 331 may extend from the first hole 330 in the direction opposite to the second direction.

Because the stand 300 is coupled to the rear chassis 100 and the rear cover 200 while being moved in the second direction, the stand recess 230 may form a space in which the stand coupling part 312 may be moved in the second direction after the stand coupling part 312 is coupled to the stand recess 230.

In addition to the coupling between the stud 120 and the key hole 320, the coupling between the stand 300, the rear chassis 100, and the rear cover 200 needs to be strengthened.

A guide protrusion 340 protruding in the second direction may be provided on an upper side of the stand body 310. Because the second direction may be the upward direction, the guide protrusion 340 may protrude upward. A guide groove 240 (FIG. 11) into which the guide protrusion 340 may be inserted as the stand 300 is moved in the second direction may be formed by a guide groove forming portion 241. As the guide protrusion 340 may be inserted into the guide groove 240 (FIG. 11), movement of the stand 300 to be coupled to the rear chassis 100 and the rear cover 200 may be guided, and the coupling of the stand 300 may be strengthened. This will be described later with reference to FIG. 11.

A guide hook 350 (FIG. 12) that functions similarly to the guide protrusion 340 may be provided at the front of stand body 310. This will be described in detail later with reference to FIG. 12.

Figure 9:
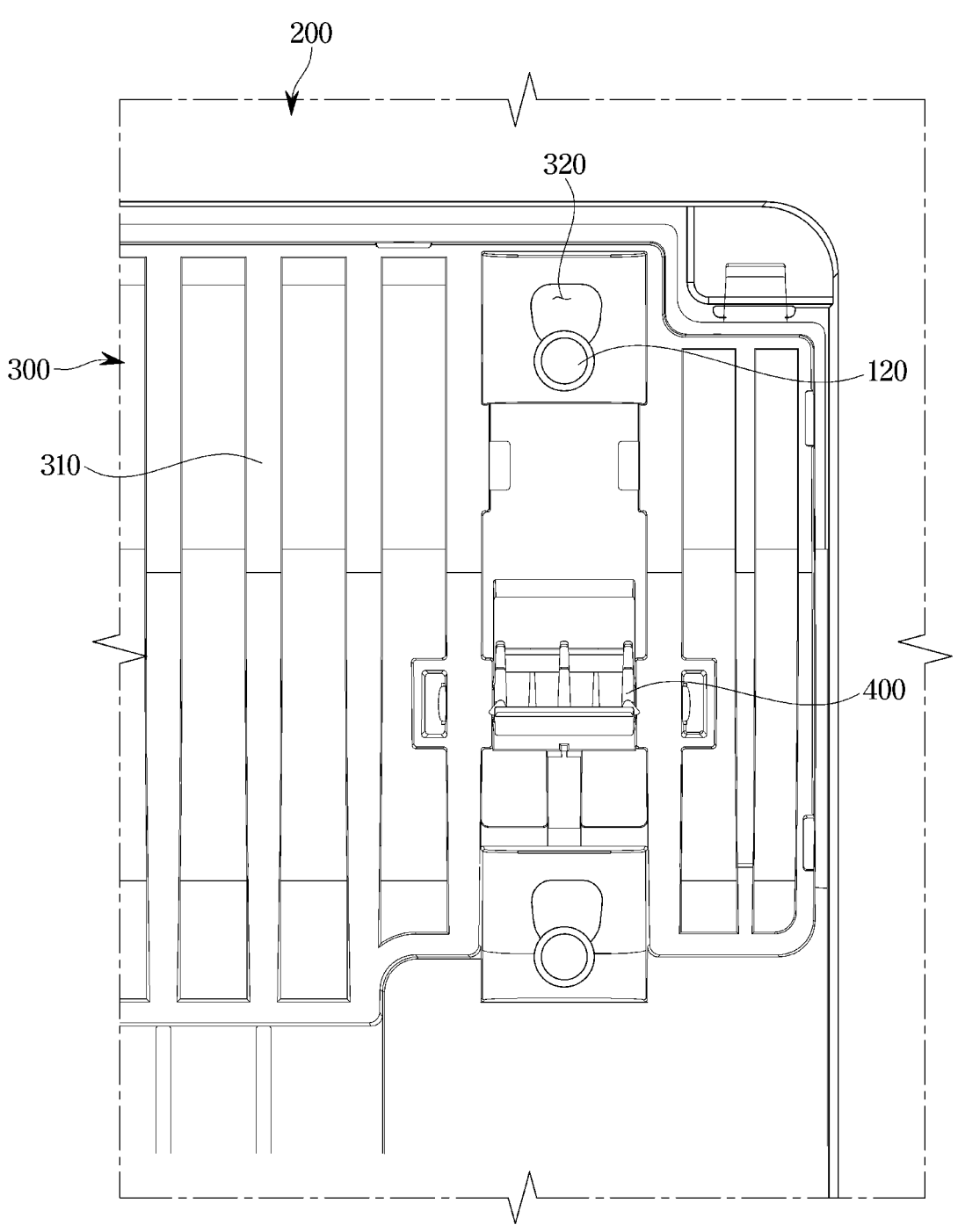
FIG. 9 is a rear view illustrating that the stud of the rear support member of FIG. 8 is moved after being inserted into the key hole of the stand.

FIG. 9 is a rear view illustrating that the stud of the rear support member of FIG. 8 is moved after being inserted into the key hole of the stand.

As illustrated in FIG. 9, the stud 120 may be moved from the second state to the first state.

The stand 300 may be moved in the second direction, and the stud 120 may be moved relative to the stand 300 in the direction opposite to the second direction.

In this case, the stud 120 may be accommodated in the second hole 331. Because a size of the second hole 331 is smaller than a size of the head 130 of the stud 120, the stand 300 may be prevented from being separated from the rear chassis 100 and the rear cover 200 and moved forward and rearward.

The guide protrusion 340 is accommodated in the guide groove (FIG. 11, 240), and the guide hook 350 (FIG. 12) is accommodated in a guide hook groove 250 (FIG. 12), so that the coupling between the stand 300, the rear chassis 100, and the rear cover 200 may be strengthened.

As the stand 300 is moved in the second direction, a gap between an upper side of the stand coupling part 312 and an upper inner surface of the stand recess 230 may be reduced.

The couplings between the stud 120 and the key groove, the guide protrusion 340 and the guide groove 240, and the guide hook 350 and the guide hook groove 250 will be described in detail below.

Figure 10:
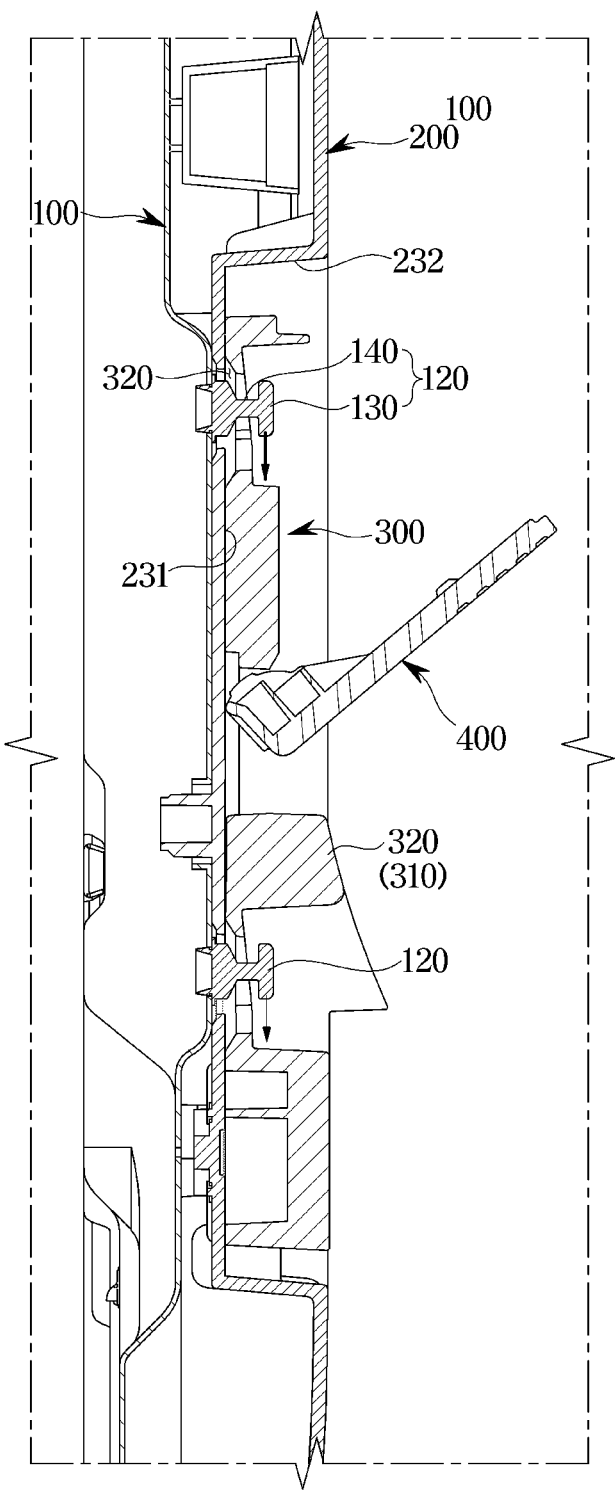
FIG. 10 is a cross-sectional view taken along line A-A' of FIG. 8 in order to illustrate movement of the stud.

FIG. 10 is a cross-sectional view taken along line A-A' of FIG. 8 in order to illustrate movement of the stud.

As illustrated in FIG. 10, the stand 300 may be moved in the second direction. As illustrated, the second direction may be the upward direction. In this case, the stud 120 is relatively moved from the first hole 330 to the second hole 331. Because the second hole 331 may be positioned to extend further downward than the first hole 330, the stud 120 may be moved downward.

Because the studs 120 may be positioned on upper and lower sides, respectively, the studs 120 positioned on the upper and lower sides may be moved downward with respect to the key hole 320, respectively.

As the studs 120 as described above are accommodated in the second hole 331, the movement of the stand 300 in the front-rear direction may be restricted. In other words, the stand 300 is restricted from being separated from the rear chassis 100 and the rear cover 200 in the front-rear direction.

Figure 11:
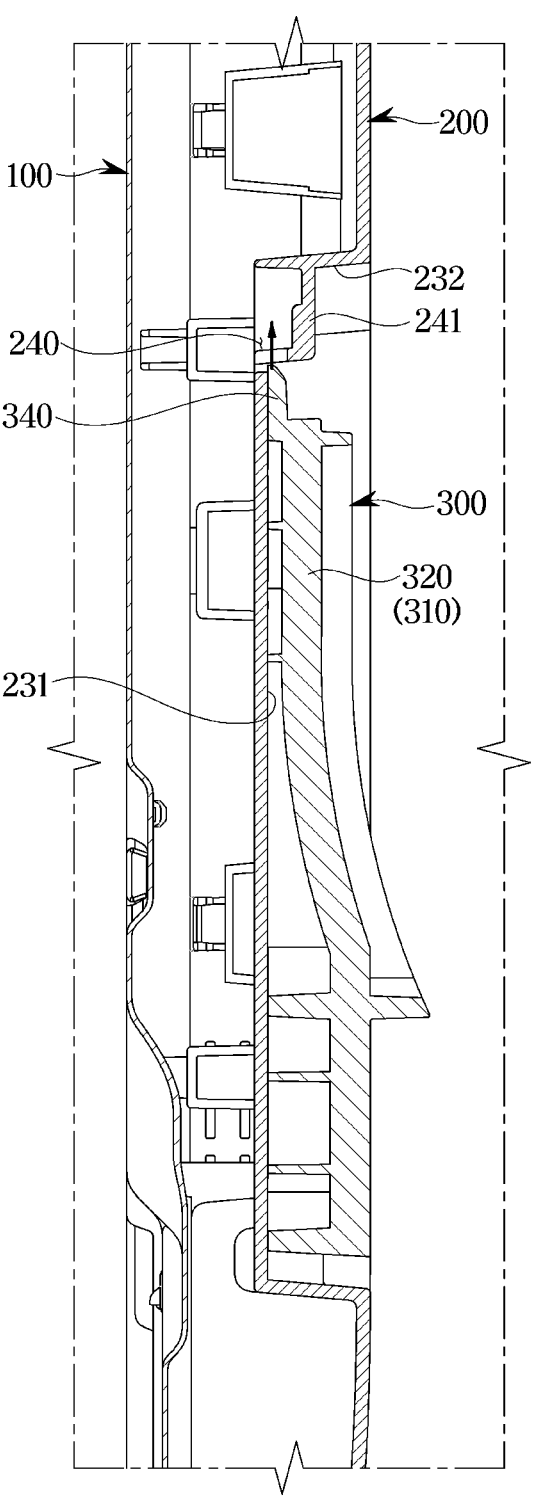
FIG. 11 is a cross-sectional view taken along line B-B' of FIG. 8 in order to illustrate movement of a guide protrusion.

FIG. 11 is a cross-sectional view taken along line B-B' of FIG. 8 in order to illustrate movement of a guide protrusion.

As illustrated in FIG. 11, as the stand 300 be moved in the second direction, the guide protrusion 340 may be relatively moved upward.

As described above, the guide protrusion 340 may have a shape of protruding upward from an upper surface of the stand 300.

The rear cover 200 may include the guide groove 240 formed at a position corresponding to the guide protrusion 340 to strengthen the coupling between the rear cover 200 and the stand 300 by the guide protrusion 340 being inserted into the guide groove 240.

The guide groove 240 may be formed by the guide groove forming portion 241. The guide groove forming portion 241 may extend downward at a point spaced apart from the stand contact portion 231 forming the front of the stand recess 230 on an outer surface of the upper stand guide portion 232 surrounding the stand recess 230 (FIG. 7). Accordingly, a guide groove 240 with an open lower side may be formed between the stand 300 guide groove forming portion 241 and the stand contact portion 231.

The guide protrusion 340 may be moved upward as the stand 300 is moved to be inserted into the guide groove 240.

In a case in which the stand 300 is moved rearward as the guide protrusion 340 is inserted into the guide groove 240, the guide protrusion 340 also tends to be moved in the rearward direction. However, because the guide groove forming portion 241 is positioned at the rear of the guide protrusion 340 so that the movement of the guide protrusion 340 may be restricted, a rearward movement of the stand 300 may also be restricted together with the guide protrusion.

In order to further restrict the movement of the stand 300, a width of the guide groove 240 may be the same as a width of the guide protrusion 340.

The guide protrusion 340 and the guide groove 240 may be formed to be left and right symmetrical with respect to the display panel 10. Through this, the display panel 10 may be prevented from being tilted left and right.

Figure 12:
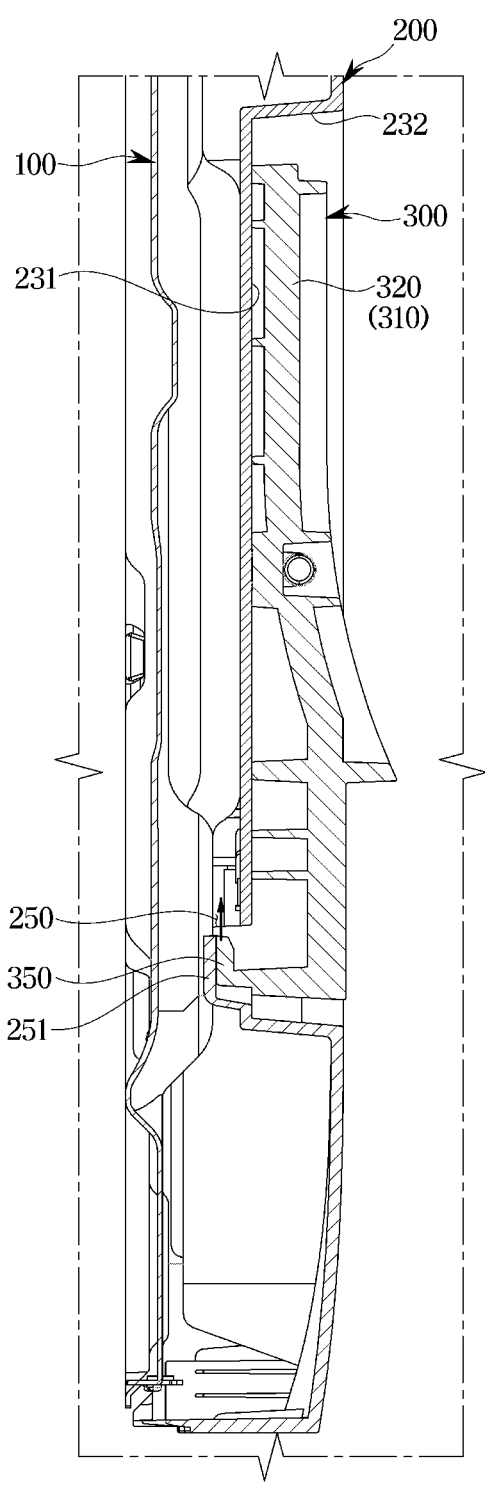
FIG. 12 is a cross-sectional view taken along line C-C' of FIG. 8 in order to illustrate movement of a guide hook.

FIG. 12 is a cross-sectional view taken along line C-C' of FIG. 8 in order to illustrate movement of a guide hook.

As illustrated in FIG. 12, as the stand 300 is moved in the second direction, the guide hook 350 may be relatively moved upward.

The guide hook 350 is a part invisible in FIG. 8. This is because the guide hook 350 is a part formed on a front surface of the stand 300.

The guide hook 350 may extend forward from the front surface of the stand 300 and then extend to be bent toward an upper side of the stand 300.

The rear cover 200 may include the guide hook groove 250 formed at a position corresponding to the guide hook 350 to strengthen the coupling between the rear cover 200 and the stand 300 by the guide hook 350 being inserted into the guide hook groove 250.

The guide hook groove 250 may be formed by a hook groove forming portion 251.

The guide hook 350 may be provided on the lower side of the stand coupling part 312 for convenience in manufacturing the guide hook 350.

Because the guide hook 350 extends forward of the stand coupling part 312, in order for the stand coupling part 312 to be completely in contact with the stand contact portion 231 of the stand recess 230, the guide hook 350 needs to be accommodated inside the stand coupling part 312. Accordingly, the hook groove forming portion 251 may form the guide hook groove 250 recessed forward from the stand coupling part 312.

The guide hook groove 250 may extend in the second direction, that is, upward, so that the guide hook 350 may be moved without being caught thereon when moved upward.

The stand coupling part 312 may be positioned at the rear of a portion where the guide hook groove 250 extends upward.

In a case in which the stand 300 is moved rearward as the guide hook 350 is inserted into the guide hook groove 250, the guide hook 350 also tends to be moved in the rearward direction. However, because the stand coupling part 312 is positioned at the rear of the guide hook 350 so that the movement of the guide hook 350 may be restricted, the rearward movement of the stand 300 may also be restricted together with the guide hook.

In order to further restrict the movement of the stand 300, a width of the guide hook groove 250 may be the same as a width of the guide hook 350.

The guide hook 350 and the guide hook groove 250 may be formed to be left and right symmetrical with respect to the display panel 10. Through this, the display panel 10 may be prevented from being tilted left and right.

Hereinafter, a process of strengthening the coupling between the stand 300, the rear chassis 100, and the rear cover 200 using the holder 400 after the movement of the stand 300 will be described.

Figure 13:
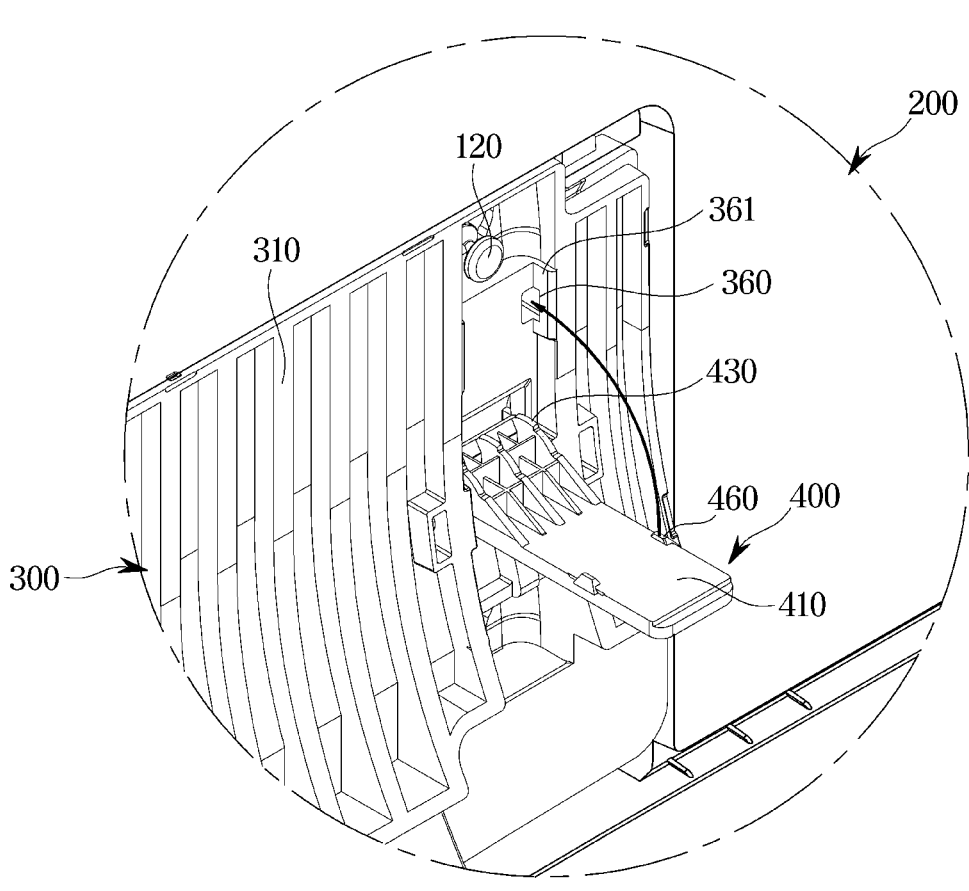
FIG. 13 is a rear perspective view of the display apparatus enlarged with a holder as a center in order to illustrate the holder.

FIG. 13 is a rear perspective view of the display apparatus enlarged with a holder as a center in order to illustrate the holder.

As illustrated in FIG. 13, the holder 400 may be rotatably coupled to the stand 300.

The holder 400 may include a holder body 410 extending in one direction about a rotation axis. The holder body 410 may have a length capable of covering the stud 120 when the holder 400 is rotated.

An insertion protrusion 460 may be provided to protrude from the holder body 410 toward the stud 120. The insertion protrusion 460 may be provided to be press-fitted into an insertion hole 360 formed on the stand body 310. Through this, the holder 400 may be prevented from rotating and moving. A relationship between the insertion protrusion 460 and the insertion hole 360 will be described in detail below with reference to FIG. 16.

When the stand 300 is inserted into the stand recess 230 of the rear cover 200 and then moves in the second direction so that the stud 120 is located in the second hole 331 of the key hole 320, the holder 400 may be moved to lock the stand 300.

Hereinafter, a process in which the holder 400 locks the stand 300 will be described. As illustrated in FIG. 13, a state in which the holder 400 does not lock may be referred to as a second position of the holder 400, and a state in which the holder 400 locks may be referred to as a first position of the holder 400.

Figure 14:
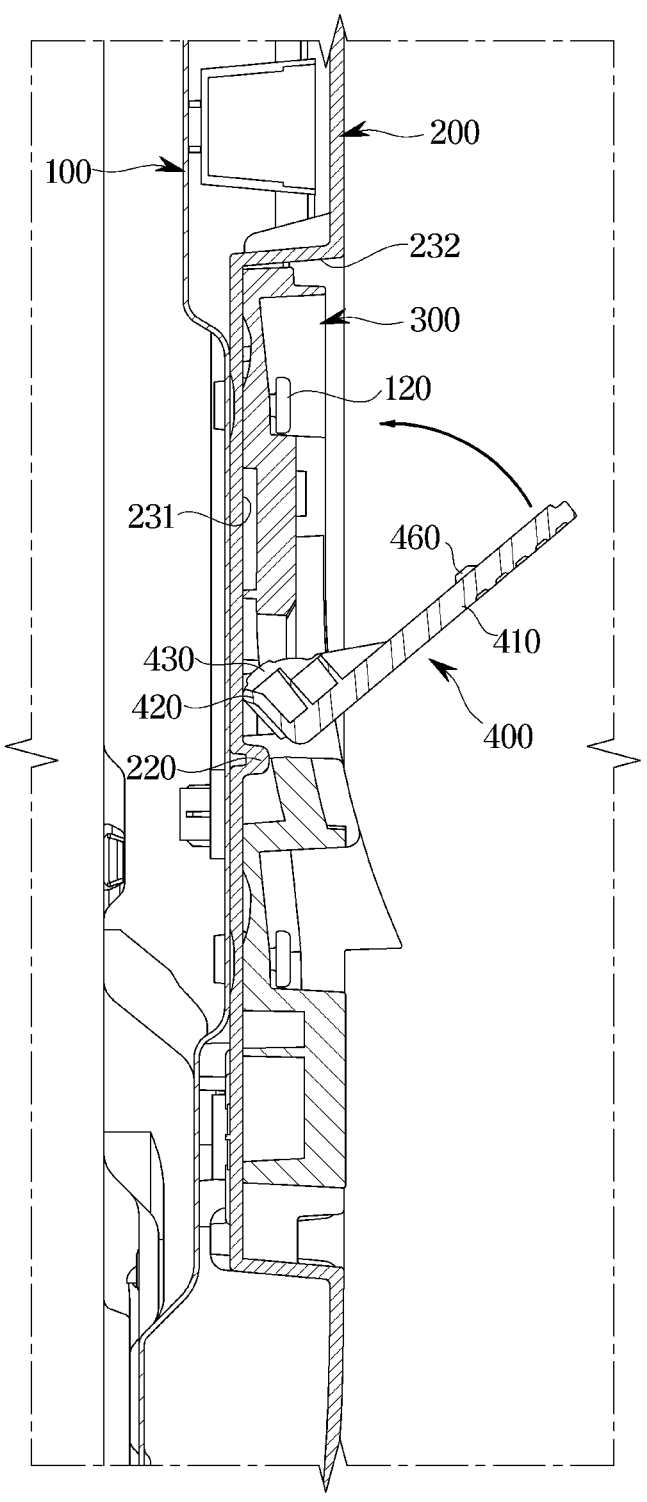
FIG. 14 illustrates a cross section of the holder when the holder is in a second position.

FIG. 14 illustrates a cross section of the holder when the holder is in a second position.

As illustrated in FIG. 14, the holder 400 includes an action rib 420.

The rear support member 50, particularly the rear cover 200 may include a reaction rib 220 protruding rearward toward the holder 400.

The holder 400 includes the action rib 420 provided at a position corresponding to the reaction rib 220 to press an upper side of the reaction rib 220 by rotation. Through this, the stand 300 may be moved upward while the action rib 420 presses the reaction rib 220 as the holder 400 is rotated.

The action rib 420 may be formed at a lower end of the holder body 410 on a side where the rotation axis is provided. The action rib 420 may be formed further forward of the holder body 410 than the rotation axis of the holder body 410.

Because the action rib 420 is a certain distance away from the rotation axis, the action rib 420 is rotated at a larger radius when the holder 400 is rotated around the rotation axis. Because the reaction rib 220 may be provided within the rotation radius of the action rib 420, the action rib 420 may come into contact with one side of the reaction rib 220 while being rotated.

When the action rib 420 is to be rotated even after coming into contact with the one side of the reaction rib 220, the action rib 420 may receive a force toward an upper rear due to the reaction of a force applied by the action rib 420 to the reaction rib 220. In this case, because the action rib 420 is a component of the holder 400 and the holder 400 is coupled to the stand 300, the movement of the action rib 420 may directly result in movement of the stand 300. After the stand 300 is moved in the second direction, movement of the stand 300 in the front-rear direction is restricted by interaction between the stud 120 and the key hole 320, interaction between the guide protrusion 340 and the guide groove 240, or interaction between the guide hook 350 and the guide hook groove 250. Therefore, the force due to the reaction received while pressing the reaction rib 220 due to the rotation of the action rib 420 may move the stand 300 upward without movement in the forward or rearward direction.

For the movement as described above, the holder 400 needs to be fixed in the first position. The insertion protrusion 460 may be provided on the holder 400 such that the holder 400 is fixed in the first position. This will be described in detail below with reference to FIG. 16.

As such, the holder 400 may be rotatable between the first position in which the action rib 420 presses the reaction rib 220 and the second position in which the action rib 420 does not press the reaction rib 220.

The holder 400 may be rotated upward to be moved from the second position to the first position, and may be rotated downward to be moved from the first position to the second position. The second position of the holder 400 may be referred to as a position in which the locking of the holder 400 is released. The holder 400 may be more easily moved to the second position by an own weight thereof while being rotated downward. Therefore, in this case, the user may more easily change the position of the holder 400 when trying to separate the stand 300 from the display apparatus 1.

A pressing protrusion 430 protruding toward the front of the holder 400 may be provided at the front of the holder body 410.

In other words, the holder 400 may be provided with the pressing protrusion 430 protruding toward the rear support member 50 to press the rear support member 50 toward the front when the holder 400 is in the first position, and to strengthen a coupling between the stand 300 and the rear support member 50 in the front-rear direction. The pressing protrusion 430 as described above will be described in detail below with reference to FIG. 15.

Figure 15:
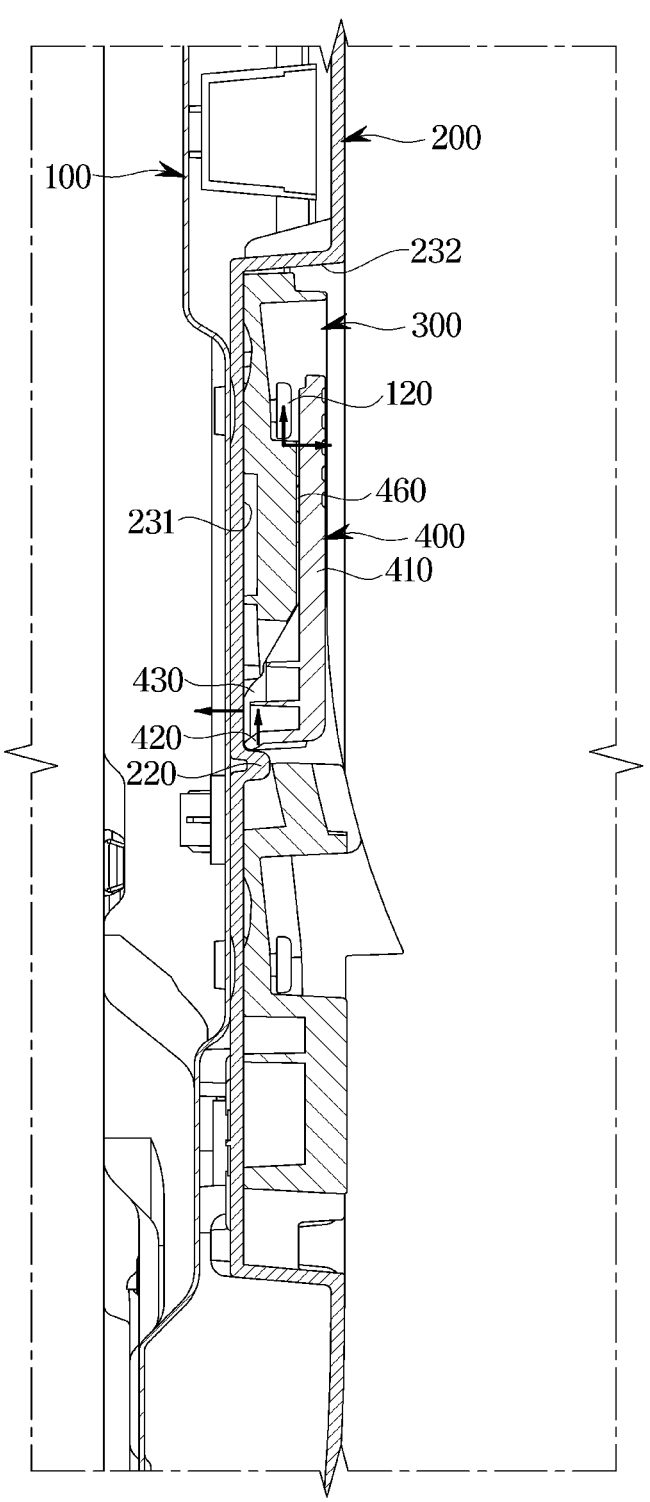
FIG. 15 illustrates a cross section of the holder when the holder is in a first position.

FIG. 15 illustrates a cross section of the holder when the holder is in a first position.

As illustrated in FIG. 15, the holder 400 may press the stand 300 to move in the second direction while being rotated to the first position.

When the stand 300 is moved in the second direction, a gap between the upper surface of the stand 300 and the stand guide portion 232 located in the second direction may be reduced.

The holder 400 may move the stud 120 as much as necessary through the movement of the stand 300.

The holder 400 may also move the stand 300 to an extent that the stud 120 presses an inner surface of the second hole 331. However, in this method, the second hole 331 may press the stud 120 in the opposite direction from which the stud 120 presses the second hole 331, and in this case, the holder 400 may be rotated from the first position toward the second position by receiving a force to rotate from the first position to the second position.

Furthermore, when the stud 120 presses the inner surface of the second hole 331, deformation such as bending may occur in the stand 300.

In order to prevent this, the action rib 420 may protrude toward the reaction rib 220 to an extent that the stud 120 does not press the opposite side of the second direction of the key hole 320 when the holder 400 is in the first position.

The reaction rib 220 may be provided in the shape of a single rib. However, the reaction rib 220 may include a first portion 221 extending in a lateral direction, and a second portion 222 spaced apart from the first portion 221 in the lateral direction and extending in the lateral direction (refer to FIG. 7). Because the reaction rib 220 is pressed by the action rib 420, bending may occur in the reaction rib 220. In this case, because the first portion 221 and the second portion 222 are separated, the deformation may be small even when bending occurs.

In order to stably restrict forward and rearward movement on upper and lower sides of the stand 300, the stud 120 and key hole 320 may be provided on the upper and lower sides of the stand 300, respectively. The studs 120 may be positioned on the upper and lower sides of the stand 300. In this case, the stud 120 provided on the upper side may be referred to as the first stud 121, and the stud 120 provided on the lower side may be referred to as a third stud 123 (refer to FIG. 7).

The smaller a difference in forces applied to the first stud 121 and the third stud 123, the more stable the stand 300 may be moved. To this end, the reaction rib 220 may be provided in the middle between the first stud 121 and the third stud 123.

More specifically, when a distance from a portion where the reaction rib 220 and the action rib 420 come into contact with each other to the stud hole 214 (FIG. 5) through which the stud 120 passes is measured, a distance to the first stud 121 and a distance to the third stud 123 from the portion where the reaction rib 220 and the action rib 420 come into contact with each other may be the same.

In other words, a distance between the reaction rib 220 and the first stud 121 may be the same as a distance between the reaction rib 220 and the third stud 123.

When the studs 120 each provided on the upper and lower sides and the key holes 320 corresponding thereto, the holder 400 including the action rib 420, and the reaction rib 220 are one set, a total of two sets may be arranged symmetrically on the left and right sides with respect to the center of the display panel 10, respectively. Through this, the display panel 10 may be prevented from being tilted in the left-right direction.

The pressing protrusion 430 may come into contact with the rear cover 200 to press the rear cover 200 forward when the holder 400 is in the first position. Because the holder 400 may be coupled to the stand coupling part 312 of the stand 300, the pressing protrusion 430 may come into contact with the stand contact portion 231 coming into contact with the stand coupling part 312. The pressing protrusion 430 may press the stand contact portion 231 toward the front.

The rear cover 200 may be made of a plastic material, and the stand contact portion 231 may also be made of a plastic material. In a case in which the stand contact portion 231 has elasticity, as the rear cover 200 presses the stand contact portion 231, the stand contact portion 231 may be deformed by being bent toward the front.

When the stand contact portion 231 is deformed toward the front, an elastic restoring force may be applied toward the rear by the pressing protrusion 430 coming into contact with the stand contact portion 231. That is, the pressing protrusion 430 may receive a force applied toward the rear.

When the pressing protrusion 430 receives the force toward the rear, the holder 400 may also receive the force toward the rear. Because the holder 400 is coupled to the stand 300, the stand 300 may also receive the force toward the rear.

Although the movement of the stand 300 in the front-rear direction may be restricted by the interaction between the stud 120 and the key hole 320, because a depth of the key hole 320 and a length of the neck 140 of the stud 120 do not exactly match, the stand 300 may move a little bit in the front-rear direction. However, when the stand 300 receives a force rearward by the pressing protrusion 430 of the holder 400, the stand 300 may be moved rearward. Also, when a portion of the stand body 310 around the key hole 320 comes into contact with the head 130 of the stud 120, the stand 300 may be stopped. Also in this case, the stand contact portion 231 continues to apply a force, which tends to move the stand 300 rearward, to the stand 300. The stand 300 may thereby be prevented from being moved in the front-rear direction.

The pressing protrusion 430 may be compared to the action rib 420 described above. Because the purpose of the action rib 420 is to move the stud 120 as much as need, there is no need for the stud 120 to press an inner surface of the key hole 320. Rather, when the stud 120 presses the inner surface of the key hole 320, deformation of the stand 300 may occur, and this may interfere with the stand 300 being accurately coupled to the rear chassis 100 and the rear cover 200. However, the pressing protrusion 430 needs to deform a portion of the rear cover 200 to press the stand 300 rearward using a restoring force acting in a direction opposite to a direction in which the rear cover 200 is deformed. Accordingly, in a case in which the pressing protrusion 430 is provided, the pressing protrusion 430 is required to protrude to an extent that the stand 300 is deformed.

Figure 16:
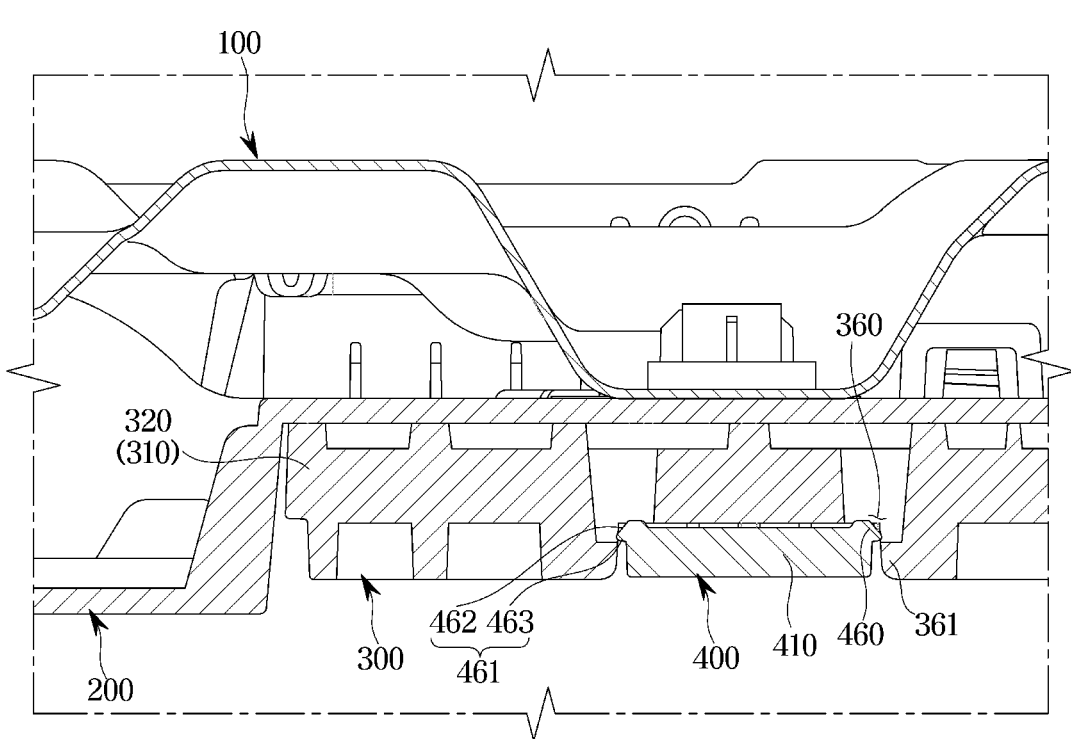
FIG. 16 illustrates a cross section of the holder when the holder is in the first position in order to illustrate an insertion protrusion.

FIG. 16 illustrates a cross section of the holder when the holder is in the first position in order to illustrate an insertion protrusion.

As illustrated in FIG. 16, the insertion protrusion 460 may have a structure of making the insertion protrusion difficult to be separated from the insertion hole 360 when the insertion protrusion is inserted into the insertion hole 360.

The insertion hole 360 may be provided at a corresponding position so that the insertion protrusion 460 may be inserted therein.

The insertion protrusion 460 may protrude from the holder body 410 toward the front of the holder 400. An insertion part 461 having a surface inclined toward the rear may be provided in front of the insertion protrusion 460. The insertion part 461 may have a cross-sectional area widening from the front to the rear. The cross section of the insertion part 461 may have a shape like an arrow as illustrated in FIG. 16.

An insertion hole forming portion 361 forming the insertion hole 360 may be provided on a side of the insertion hole 360. The insertion hole 360 may have the shape of a hole extending in the front-rear direction of the stand 300 so that the insertion protrusion 460 may be accommodated therein. In this case, the insertion hole forming portion 361 may be formed by extending a portion of the stand body 310 positioned around the insertion hole 360 toward the insertion hole 360. That is, the insertion hole forming portion 361 may be formed while covering a portion of the insertion hole 360.

A surface of the insertion hole forming portion 361 in the direction of the insertion hole 360 may be horizontal in the left-right direction.

A horizontal catching surface 463 may be formed in the left-right direction at the rear of the insertion part 461 of the insertion protrusion 460. When the insertion protrusion 460 is completely accommodated in the insertion hole 360, the catching surface 463 comes into contact with the surface of the insertion hole forming portion 361 in the direction of the insertion hole 360, so that it may be difficult for the insertion protrusion 460 to be separated from the insertion hole 360.

When the insertion protrusion 460 is inserted into the insertion hole 360, an inclined surface 462 provided on the insertion part 461 of the insertion protrusion 460 may come into contact with the insertion hole forming portion 361 and be inserted into the insertion hole 360. The insertion protrusion 460 may be provided to be symmetrical to the left and right sides of the holder 400. In this case, the respective insertion protrusions 460 become closer to each other and may be inserted into the insertion hole 360.

When all of the insertion protrusions 460 are inserted into the insertion holes 360, the insertion protrusions 460 may be prevented from being separated from the insertion holes 360 by the insertion hole forming portion 361. It is appropriate that the extent to which the insertion hole forming portion 361 extends toward the insertion hole 360 is the extent to which when the user tries to move the holder 400 to the second position, the user may move the holder 400 to the second position, but in other cases, the holder 400 is not easily moved from the first position to the second position.

In this case, it may be understood that the insertion protrusion 460 is coupled to the insertion hole 360 by a forced insertion.

Figure 17:
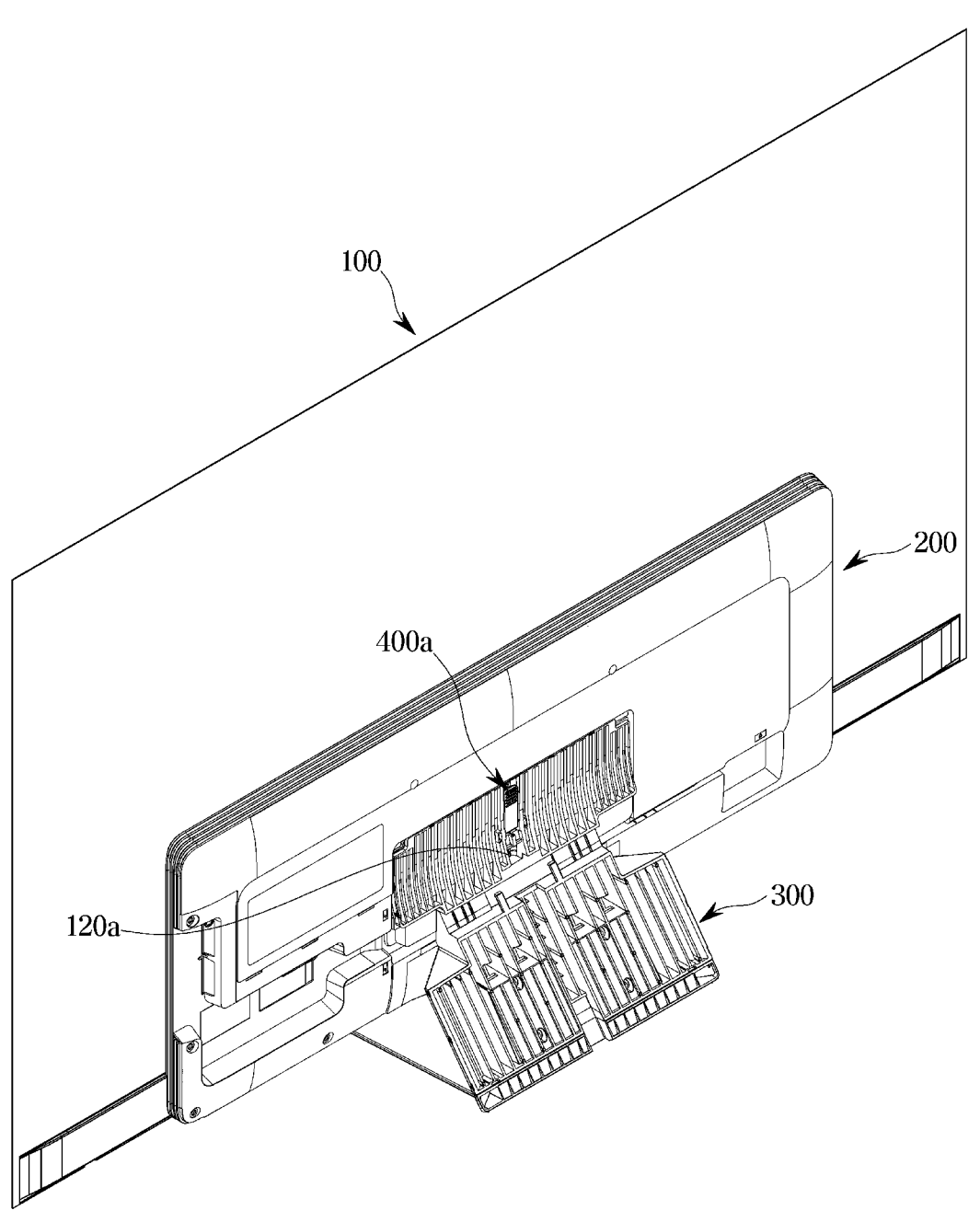
FIG. 17 is a rear perspective view of a display apparatus according to an embodiment of the disclosure.

FIG. 17 is a rear perspective view of a display apparatus according to an embodiment of the disclosure.

As illustrated in FIG. 17, only one set of studs 120a, key holes 320a, and holders 400a may be provided on the stand 300.

As described above, this is because the holders 400a do not necessarily need to be provided on both the left and right sides, respectively.

In this case, it is appropriate that the set of the studs 120a, key hole 320a, and holder 400a is provided in a center of the stand 300 to prevent the display panel 10 from being tilted.

The foregoing has illustrated and described specific embodiments. However, it should be understood by those of skill in the art that embodiments of the disclosure are not limited to the above-described embodiments, and various changes and modifications may be made without departing from the technical idea of the disclosure described in the following claims.

What is claimed is:

1. A display apparatus comprising:

a display panel;

a rear support member at a rear of the display panel and comprising a stud protruding rearward;

a stand configured to be coupled to the rear support member and comprising a key hole into which the stud is inserted in a first direction, wherein the stand is configured to be moved in a second direction relative to the stud; and a holder configured to be coupled to the stand and move the stand in the second direction so that the stud inserted into the key hole is locked in the key hole, wherein the holder is configured to be touchable and movable by a user.

2. The display apparatus of claim 1, wherein the rear support member comprises a reaction rib protruding toward the holder, wherein the holder comprises an action rib at a position corresponding to the reaction rib, wherein the action rib is configured to press one side of the reaction rib in the second direction by rotation of the holder, and wherein the stand is configured to move in the second direction while the action rib presses the reaction rib by the rotation of the holder.

3. The display apparatus of claim 2, wherein the holder is configured to rotate between a first position in which the action rib presses the reaction rib and a second position in which the action rib does not press the reaction rib.

4. The display apparatus of claim 3, wherein the action rib protrudes toward the reaction rib and does not press an opposite side of the second direction of the key hole when the holder is in the first position.

5. The display apparatus of claim 3, wherein the holder further comprises a pressing protrusion protruding toward the rear support member and pressing the rear support member toward the front when the holder is in the first position.

6. The display apparatus of claim 3, wherein the rear support member comprises:

a rear cover at the rear of the display panel; and a rear chassis between the rear cover and the display panel and supporting the display panel from the rear, and wherein the stud is coupled to the rear chassis so that the rear chassis supports the stand.

7. The display apparatus of claim 3, wherein the stud comprises:

a first stud; and a second stud below the first stud, wherein the reaction rib is between the first stud and the second stud, and wherein a distance between the reaction rib and the first stud is equal or substantially similar to a distance between the reaction rib and the second stud.

8. The display apparatus of claim 6, wherein the rear chassis comprises a rear chassis body, wherein the stud comprises:

a head positioned at an end in the first direction; and a neck extending from the head toward the rear chassis body and having a diameter smaller than a diameter of the head, and wherein the key hole comprises:

a first hole having a diameter larger than the diameter of the head; and a second hole extending from the first hole and having a diameter smaller than the diameter of the head and larger than the diameter of the neck.

9. The display apparatus of claim 6, wherein the stand comprises a guide protrusion protruding upward from an upper surface of the stand, and wherein the rear cover comprises a guide groove at a position corresponding to the guide protrusion and into which the guide protrusion is inserted.

10. The display apparatus of claim 6, wherein the stand comprises a guide hook extending forward from a front surface of the stand and then extending to be bent toward an upper side of the stand, wherein the rear cover comprises a guide hook groove at a position corresponding to the guide hook, and wherein the guide hook is inserted into the guide hook groove.

11. The display apparatus of claim 6, wherein the holder further comprises an insertion protrusion protruding toward the rear cover when in the first position, and wherein the stand further comprises an insertion hole into which the insertion protrusion is inserted to fix the holder when the holder is in the first position.

12. The display apparatus of claim 2, wherein the reaction rib comprises:

a first portion extending in a lateral direction; and a second portion spaced apart from the first portion in the lateral direction and extending in the lateral direction.

13. The display apparatus of claim 2, wherein the stud comprises:

a first stud on a left side; and a second stud symmetrical to the first stud.

14. The display apparatus of claim 6, wherein the second direction is an upward direction, wherein the stand further comprises a stand coupling part coupled to the rear cover, and wherein the rear cover comprises a stand recess that is recessed forward and having a shape corresponding to the stand coupling part.

15. The display apparatus of claim 3, wherein the holder is configured to be moved from the second position to the first position by being rotated upward and moved from the first position to the second position by being rotated downward.

* * * * *